(12) United States Patent
Zhang et al.

(10) Patent No.: US 11,460,672 B2
(45) Date of Patent: Oct. 4, 2022

(54) OPTICAL IMAGING SYSTEM

(71) Applicant: Zhejiang Sunny Optical Co., Ltd, Ningbo (CN)

(72) Inventors: Xiaobin Zhang, Ningbo (CN); Guihua Xie, Ningbo (CN); Fujian Dai, Ningbo (CN); Liefeng Zhao, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 330 days.

(21) Appl. No.: 16/891,808

(22) Filed: Jun. 3, 2020

(65) Prior Publication Data
US 2020/0409107 A1   Dec. 31, 2020

(51) Int. Cl.
*G02B 9/64* (2006.01)
*G02B 13/00* (2006.01)
*G02B 27/00* (2006.01)

(52) U.S. Cl.
CPC .......... *G02B 13/0045* (2013.01); *G02B 9/64* (2013.01); *G02B 27/0025* (2013.01)

(58) Field of Classification Search
CPC ............ G02B 27/0025; G02B 13/0045; G02B 13/0015; G02B 9/64; G02B 9/00
USPC .......................................................... 359/750
See application file for complete search history.

(56) References Cited

U.S. PATENT DOCUMENTS

| | | | | |
|---|---|---|---|---|
| 11,215,797 B2* | 1/2022 | Huang | ................ | H04N 5/2253 |
| 2016/0170180 A1* | 6/2016 | Son | .................... | G02B 13/0045 |
| | | | | 359/708 |
| 2018/0164553 A1* | 6/2018 | Son | .................... | G02B 13/0045 |
| 2019/0025552 A1 | 1/2019 | Tsai et al. | | |
| 2019/0154974 A1* | 5/2019 | Chen | .................. | G02B 27/0037 |
| 2020/0064596 A1* | 2/2020 | Huang | ..................... | G02B 9/64 |
| 2020/0241244 A1* | 7/2020 | Chen | .................. | G02B 27/0037 |
| 2020/0257088 A1* | 8/2020 | Son | .................... | G02B 13/0045 |
| 2021/0364739 A1* | 11/2021 | Chen | .................. | G02B 27/0037 |

FOREIGN PATENT DOCUMENTS

JP   6400104 B2   10/2018

OTHER PUBLICATIONS

Intellectual Property India Office Action for Application No. 202014022704, dated Apr. 19, 2021, 5 pages.

* cited by examiner

*Primary Examiner* — William R Alexander
(74) *Attorney, Agent, or Firm* — Barnes & Thornburg LLP

(57) ABSTRACT

The present disclosure discloses an optical imaging system including, sequentially from an object side to an image side along an optical axis, a first lens, a second lens, a third lens, a fourth lens, a fifth lens, a sixth lens and a seventh lens, each of which has refractive power. An object-side surface of the first lens is concave, and an image-side surface thereof is convex; the sixth lens has a positive refractive power; and the seventh lens has a negative refractive power, and an object-side surface thereof is convex. Half of a diagonal length ImgH of an effective pixel area on an imaging plane of the optical imaging system satisfies 6 mm<ImgH<7 mm; and a total effective focal length f of the optical imaging system and an effective focal length f6 of the sixth lens satisfy $0.22 \leq f/f6 < 1$.

20 Claims, 11 Drawing Sheets

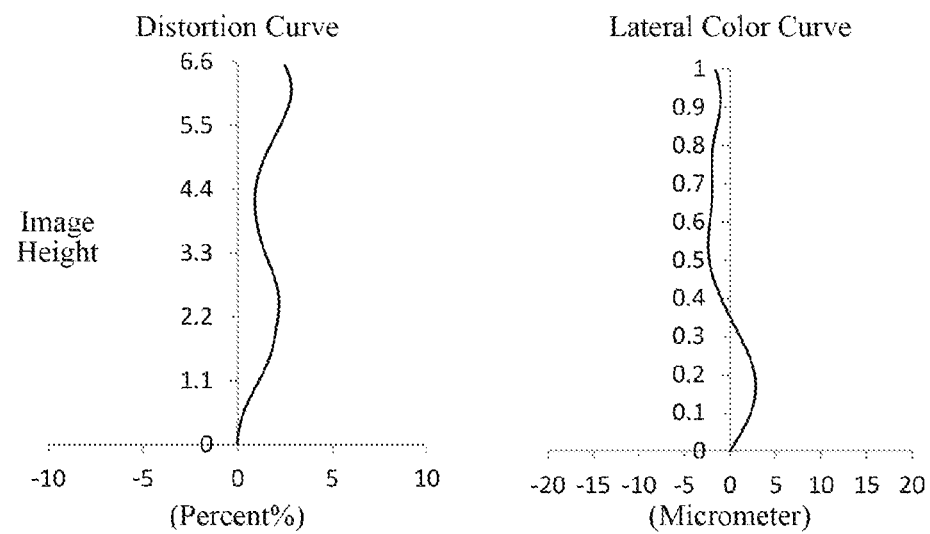
Fig. 2C
Fig. 2D
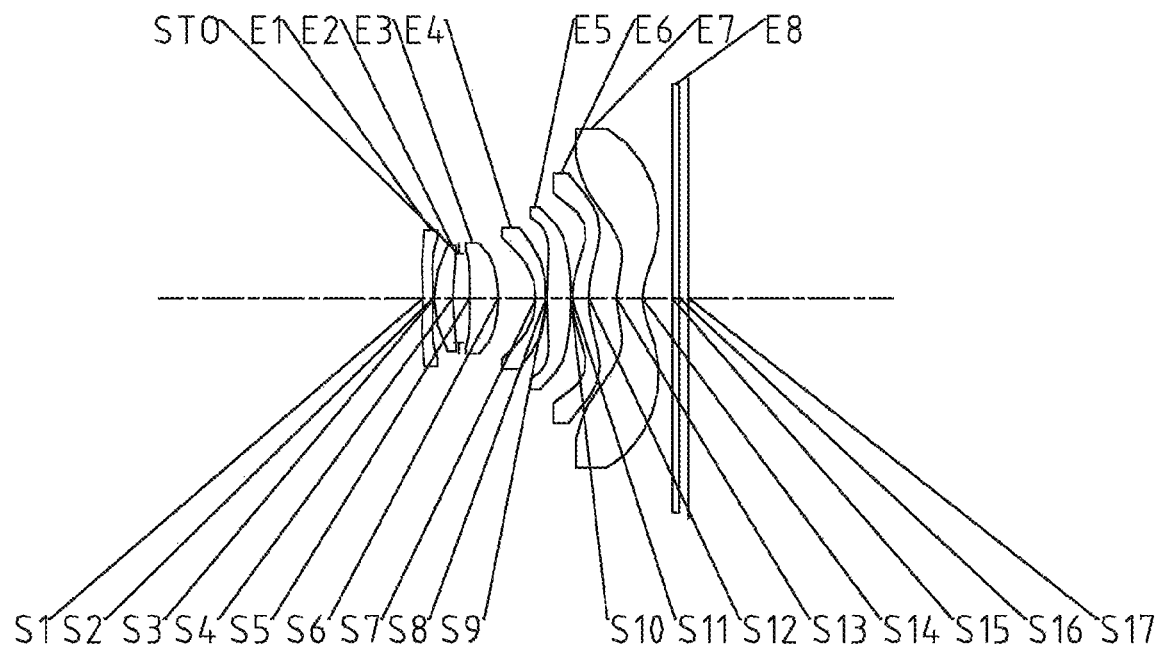
Fig. 3

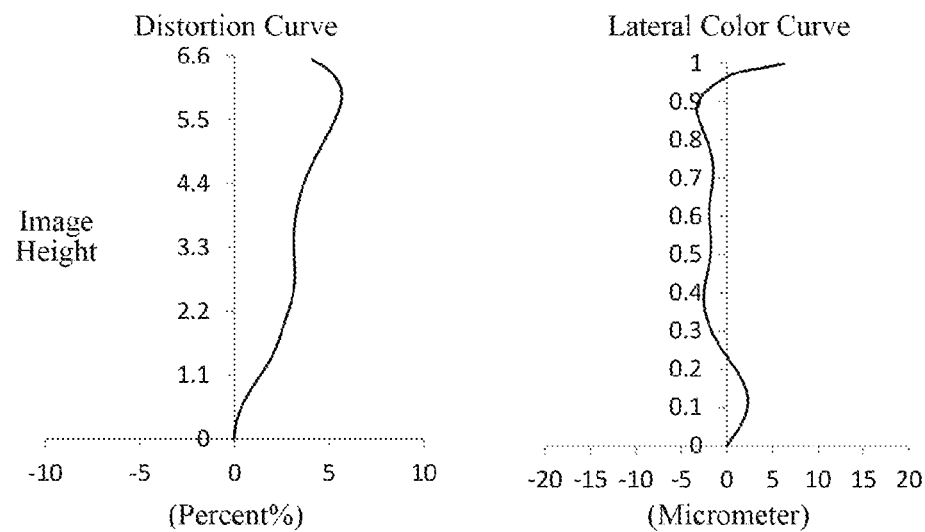
Fig. 10C
Fig. 10D
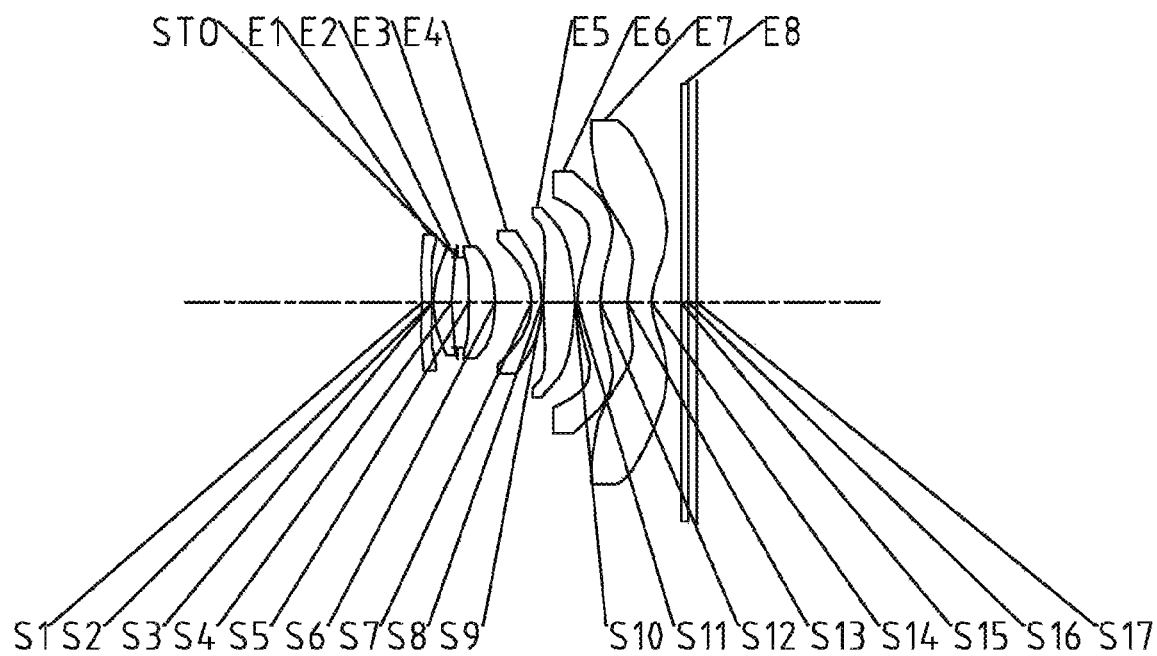
Fig. 11

OPTICAL IMAGING SYSTEM

CROSS-REFERENCE TO RELATED APPLICATION

This application claims benefit of priority to Chinese Patent Application No. 201910571245.2 filed on Jun. 28, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including seven lenses.

BACKGROUND

With the rapid development of portable electronic devices, users have increasingly strict requirements on the imaging quality and other photographic functions of portable electronic devices, such as smart phones. Mobile phone imaging lens assemblies are required to have higher resolution, larger field of view, more effective light flux and higher signal-to-noise ratio, which means that mobile phone imaging lens assemblies need to have the characteristics of large imaging plane, large wide field-of-view angle and large aperture. Generally, increasing the number of lenses to further improve the imaging quality is a common way to improve the imaging quality of mobile phones. However, improving the imaging quality simply by increasing the number of lenses is obviously not conducive to the miniaturization of the lens assembly, and does not meet the market demand for thinner mobile phones. How to design a lens assembly with a large imaging plane, a larger wide field-of-view angle, and a larger aperture while ensuring the imaging quality and keeping the size of the lens assembly unchanged or even becoming smaller is a problem that needs to be solved urgently.

SUMMARY

The present disclosure provides an optical imaging system, for example, a lens assembly with a large imaging plane and a wide field-of-view angle, that is applicable to portable electronic products and at least solves or partially addresses at least one of the above disadvantages of the prior art.

In one aspect, the present disclosure provides an optical imaging system which includes, sequentially from an object side to an image side along an optical axis, a first lens, a second lens, a third lens, a fourth lens, a fifth lens, a sixth lens and a seventh lens having refractive power. An object-side surface of the first lens may be a concave surface, and an image-side surface of the first lens may be a convex surface; the sixth lens may have a positive refractive power; and the seventh lens may have a negative refractive power.

In one embodiment, half of a diagonal length ImgH of an effective pixel area on an imaging plane of the optical imaging system may satisfy 6 mm<ImgH<7 mm.

In one embodiment, a total effective focal length f of the optical imaging system and an effective focal length f6 of the sixth lens may satisfy $0.22 \leq f/f6<1$.

In one embodiment, half of a maximal field-of-view HFOV of the optical imaging system and a total effective focal length f of the optical imaging system may satisfy 2 mm<tan(HFOV/2)*f<2.9 mm.

In one embodiment, an effective focal length f4 of the fourth lens and an entrance pupil diameter EPD of the optical imaging system may satisfy 2<|f4/EPD|<3.

In one embodiment, a maximum effective radius DT31 of an object-side surface of the third lens and a maximum effective radius DT21 of an object-side surface of the second lens may satisfy 0.5<DT31/DT21<1.

In one embodiment, a spaced interval T34 between the third lens and the fourth lens along the optical axis, a spaced interval T67 between the sixth lens and the seventh lens along the optical axis and a distance TTL along the optical axis from the object-side surface of the first lens to an imaging plane of the optical imaging system may satisfy 0<(T34+T67)/TTL<0.5.

In one embodiment, a center thickness CT4 of the fourth lens along the optical axis, a center thickness CT5 of the fifth lens along the optical axis, a center thickness CT6 of the sixth lens along the optical axis and a total effective focal length f of the optical imaging system may satisfy 0<(CT4+CT5+CT6)/f<0.6.

In one embodiment, a radius of curvature R13 of an object-side surface of the seventh lens, a radius of curvature R14 of an image-side surface of the seventh lens and an effective focal length f7 of the seventh lens may satisfy −0.5<(R13+R14)/f7<0.

In one embodiment, a radius of curvature R1 of the object-side surface of the first lens and a radius of curvature R2 of the image-side surface of the first lens may satisfy $0.6<R1/R2 \leq 1.5$.

In one embodiment, a radius of curvature R11 of an object-side surface of the sixth lens and a radius of curvature R12 of an image-side surface of the sixth lens may satisfy 0<(R12−R11)/(R12+R11)<0.5.

In one embodiment, a center thickness CTi of the i-th lens along the optical axis may satisfy CTi<1 mm, where i=1, 2, 3, 4, 5, 6 or 7.

In one embodiment, half of a diagonal length ImgH of an effective pixel area on an imaging plane of the optical imaging system, a radius of curvature R7 of an object-side surface of the fourth lens and a radius of curvature R8 of an image-side surface of the fourth lens may satisfy $1.01 \leq ImgH/|R7+R8|<1.3$.

The present disclosure employs seven lenses, and the optical imaging system has at least one advantageous effect such as miniaturization, high image quality, large imaging plane, wide field-of-view angle and large aperture and the like by rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 2A to 2D illustrate a longitudinal aberration curve, an astigmatic curve, a distortion curve and a lateral color curve of the optical imaging system of the Example 1, respectively;

FIG. 3 illustrates a schematic structural view of an optical imaging system according to Example 2 of the present disclosure;

FIGS. 10A to 10D illustrate a longitudinal aberration curve, an astigmatic curve, a distortion curve and a lateral color curve of the optical imaging system of the Example 5, respectively;

FIG. 11 illustrates a schematic structural view of an optical imaging system according to Example 6 of the present disclosure;

DETAILED DESCRIPTION OF EMBODIMENTS

Figure 1:
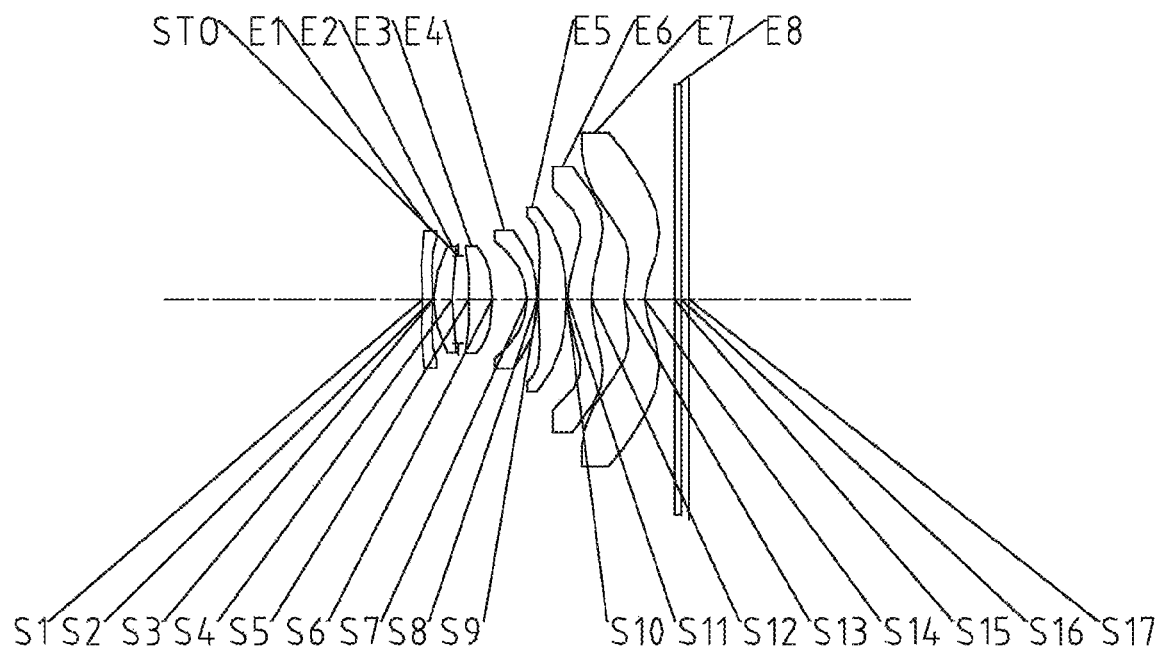
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, seven lenses having refractive power, i.e. a first lens, a second lens, a third lens, a fourth lens, a fifth lens, a sixth lens, and a seventh lens. The seven lenses are arranged sequentially from an object side to an image side along an optical axis. Among the first lens to the seventh lens, there is an air interval between any two adjacent lenses.

In an exemplary embodiment, an object-side surface of the first lens may be a concave surface, and an image-side surface of the first lens may be a convex surface; the sixth lens may have a positive refractive power; and the seventh lens may have a negative refractive power, and an object-side surface of the seventh lens may be a convex surface.

In an exemplary embodiment, the optical imaging system according to the present disclosure may satisfy: 6 mm<ImgH<7 mm, where ImgH is half of a diagonal length of an effective pixel area on an imaging plane of the optical imaging system. More specifically, ImgH may further satisfy: 6.30 mm≤ImgH≤6.60 mm. Satisfying the conditional expression 6 mm<ImgH<7 mm may ensure that the imaging system has a larger image surface and achieve the characteristic of high resolution.

In an exemplary embodiment, the optical imaging system according to the present disclosure may satisfy: $0.22 \le f/f6 < 1$, where f is a total effective focal length of the optical imaging system and f6 is an effective focal length of the sixth lens. More specifically, f and f6 may further satisfy: $0.20 \le f/f6 \le 0.80$. The conditional expression $0.22 \le f/f6 < 1$ restricts the effective focal length of the sixth lens, which is conducive to the convergence of the sixth lens to light, thereby controlling the effective aperture of the seventh lens, and improving the manufacturability of the seventh lens.

In an exemplary embodiment, the optical imaging system according to the present disclosure may satisfy: 2 mm<tan(HFOV/2)*f<2.9 mm, where HFOV is half of a maximal field-of-view of the optical imaging system and f is a total effective focal length of the optical imaging system. More specifically, HFOV and f may further satisfy: 2.30 mm≤tan(HFOV/2)*f≤2.60 mm. By restricting half of the maximal field-of-view of the imaging system and controlling the effective focal length of the imaging system, the imaging effect of the system with a large imaging plane may be achieved.

In an exemplary embodiment, the optical imaging system according to the present disclosure may satisfy: $2<|f4/EPD|<3$, where f4 is an effective focal length of the fourth lens and EPD is an entrance pupil diameter of the optical imaging system. More specifically, f4 and EPD may further satisfy: $2.10 \le |f4/EPD| \le 2.80$. By reasonably assigning the effective focal length of the fourth lens and restricting the entrance pupil diameter of the imaging system, the imaging system with a large imaging plane has a larger aperture, which may ensure that the system has a smaller F number and enhance the imaging effect in a dark environment.

In an exemplary embodiment, the optical imaging system according to the present disclosure may satisfy: $0.5<DT31/DT21<1$, where DT31 is a maximum effective radius of an object-side surface of the third lens and DT21 is a maximum effective radius of an object-side surface of the second lens. More specifically, DT31 and DT21 may further satisfy: $0.80 \le DT31/DT21 \le 0.95$. By limiting the ratio of the maximum effective radius of the object-side surface of the second lens to the maximum effective radius of the object-side surface of the third lens within a reasonable range, the ability of the second lens to converge light can be controlled. On the one hand, the size of the lens assembly may be reduced to meet the miniaturization of the lens assembly; and on the other hand, the resolution may be improved.

In an exemplary embodiment, the optical imaging system according to the present disclosure may satisfy: $0<(T34+T67)/TTL<0.5$, where TTL is a distance along the optical axis from an object-side surface of the first lens to an imaging plane of the optical imaging system, T34 is a spaced interval between the third lens and the fourth lens along the optical axis and T67 is a spaced interval between the sixth lens and the seventh lens along the optical axis. More specifically, T34, T67 and TTL may further satisfy: $0.15 \le (T34+T67)/TTL \le 0.30$. By reasonably controlling the ratio of the sum of the air interval between the third lens and the fourth lens along the optical axis and the air interval between the sixth lens and the seventh lens along the optical axis to the total track length, the risk of ghosting in the system may be effectively reduced, and the size of the lens group may be effectively compressed.

In an exemplary embodiment, the optical imaging system according to the present disclosure may satisfy: $0<(CT4+CT5+CT6)/f<0.6$, where CT4 is a center thickness of the fourth lens along the optical axis, CT5 is a center thickness of the fifth lens along the optical axis, CT6 is a center thickness of the sixth lens along the optical axis and f is a total effective focal length of the optical imaging system. More specifically, CT4, CT5, CT6 and f may further satisfy: $0.20 \le (CT4+CT5+CT6)/f \le 0.50$. By controlling the sum of the center thickness of the fourth lens, the fifth lens, and the sixth lens, the following advantages may be achieved: the size of the system is effectively shortened to achieve the miniaturization of the system; the spherical aberration and axial chromatic aberration of the system is effectively corrected; and the risk of ghost images caused by the internal reflection between lenses is effectively avoided.

In an exemplary embodiment, the optical imaging system according to the present disclosure may satisfy: $-0.5<(R13+R14)/f7<0$, where R13 is a radius of curvature of an object-side surface of the seventh lens, R14 is a radius of curvature of an image-side surface of the seventh lens and f7 is an effective focal length of the seventh lens. More specifically, R13, R14 and f7 may further satisfy: $-0.40 \le (R13+R14)/f7 \le -0.15$. Controlling the radii of curvature of the object-side surface and image-side surface of the seventh lens and the effective focal length of the seventh lens is beneficial to reduce the effective aperture of the seventh lens, and at the same time, to control the center thickness of the seventh lens, so that the seventh lens has good processability. Optionally, the object-side surface of the seventh lens may be a convex surface and the image-side surface of the seventh lens may be a concave surface.

In an exemplary embodiment, the optical imaging system according to the present disclosure may satisfy: $0.6<R1/R2 \le 1.5$, where R1 is a radius of curvature of an object-side surface of the first lens and R2 is a radius of curvature of an image-side surface of the first lens. More specifically, R1 and R2 may further satisfy: $0.80 \le R1/R2 \le 1.40$. By controlling the ratio of the radius of curvature of the object-side surface of the first lens to the radius of curvature of the image-side surface of the first lens, the ability of the first lens to converge light is controlled. When the ratio is between 0.6 and 1.5, the refractive power of the first lens is small, which is beneficial to correct the aberration of the system. Optionally, the object-side surface of the first lens may be a concave surface and the image-side surface of the first lens may be a convex surface.

In an exemplary embodiment, the optical imaging system according to the present disclosure may satisfy: $0<(R12-R11)/(R12+R11)<0.5$, where R11 is a radius of curvature of an object-side surface of the sixth lens and R12 is a radius of curvature of an image-side surface of the sixth lens. More specifically, R11 and R12 may further satisfy: $0.05 \le (R12-R11)/(R12+R11) \le 0.30$. Controlling the radius of curvature of the object-side surface of the sixth lens and the radius of curvature of the image-side surface of the sixth lens may be used to control the ratio of the edge thickness of the sixth lens to the center thickness of the sixth lens, which is beneficial to improve the manufacturability of the sixth lens. Optionally, the object-side surface of the sixth lens may be a convex surface and the image-side surface of the sixth lens may be a concave surface.

In an exemplary embodiment, the lenses (first lens to seventh lens) in the optical imaging system of the present disclosure each has a center thickness along the optical axis of less than 1 mm, that is, the optical imaging system according to the present disclosure may satisfy: $CTi<1$ mm, where i=1, 2, 3, 4, 5, 6 or 7. On the one hand, controlling the center thickness of any one of the lenses is beneficial to reduce the total length of the lens assembly and shorten the size of the lens assembly. On the other hand, controlling the center thickness of any one of the lenses is beneficial to the molding of the lens, thereby facilitating lens manufacturing.

In an exemplary embodiment, the optical imaging system according to the present disclosure may satisfy: 1.01≤ImgH/|R7+R8|<1.3, where ImgH is half of a diagonal length of an effective pixel area on an imaging plane of the optical imaging system, R7 is a radius of curvature of an object-side surface of the fourth lens and R8 is a radius of curvature of an image-side surface of the fourth lens. More specifically, ImgH, R7 and R8 may further satisfy: 1.01≤ImgH/|R7+R8|≤1.20. Reasonably controlling the ratio of the image height to the absolute value of the sum of the radii of curvature of the object-side surface and image-side surface of the fourth lens, on the one hand, is conducive to controlling the shape of the fourth lens, which is convenient for the molding of the lens; on the other hand, is helpful to improve the relative illuminance of the edge field-of-view. Optionally, the object-side surface of the fourth lens may be a concave surface and the image-side surface of the fourth lens may be a convex surface.

In an exemplary embodiment, the optical imaging system described above may further include a stop. The stop may be disposed at an appropriate position as needed, for example, between the second lens and the third lens. Optionally, the above optical imaging system may further include an optical filter for correcting the color deviation and/or a protective glass for protecting the photosensitive element on the imaging plane.

The optical imaging system according to the above embodiments of the present disclosure may employ a plurality of lenses, such as seven lenses as described above. By properly assigning the refractive power of each lens, the surface shape, the center thickness of each lens, and spaced intervals along the optical axis between the lenses, the size and the sensitivity of the imaging system may be effectively reduced, and the workability of the imaging system may be improved, such that the imaging system is more advantageous for production processing and may be applied to portable electronic products. The optical imaging system according to the above embodiments of the present disclosure has the characteristics of large imaging plane, wide field-of-view angle, and large aperture, and may better meet the application requirements of the imaging lens assembly on a smartphone.

In the embodiments of the present disclosure, at least one of the surfaces of each lens is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, and the seventh lens is aspheric. Optionally, the object-side surface and the image-side surface of each of the first lens, the second lens, the third lens, the fourth lens, the fifth lens, the sixth lens, and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 1 shows a table of basic parameters of the optical imaging system in example 1, wherein the units for the radius of curvature, the thickness and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | −8.3079 | 0.3000 | 1.68 | 19.24 | −146.88 | −94.8434 |
| S2 | aspheric | −9.1969 | 0.0300 | | | | −83.1308 |
| S3 | aspheric | 2.9075 | 0.5484 | 1.55 | 56.11 | 11.53 | 0.2360 |
| S4 | aspheric | 5.0450 | 0.1765 | | | | 2.3261 |
| STO | spherical | infinite | 0.3173 | | | | |
| S5 | aspheric | 32.3358 | 0.6921 | 1.55 | 56.11 | 8.30 | −20.5193 |
| S6 | aspheric | −5.2323 | 1.0313 | | | | 0.9926 |
| S7 | aspheric | −1.9883 | 0.3000 | 1.68 | 19.24 | −5.78 | 0.0370 |
| S8 | aspheric | −4.2858 | 0.0300 | | | | 0.6996 |
| S9 | aspheric | −74.0230 | 0.8485 | 1.55 | 56.11 | 11.63 | 99.0000 |
| S10 | aspheric | −5.8711 | 0.0318 | | | | 1.0092 |
| S11 | aspheric | 2.8389 | 0.7009 | 1.67 | 20.37 | 9.51 | −4.0064 |
| S12 | aspheric | 4.6343 | 0.9614 | | | | −0.3759 |
| S13 | aspheric | 2.3897 | 0.6096 | 1.54 | 55.87 | −10.05 | −0.9389 |
| S14 | aspheric | 1.5086 | 0.8862 | | | | −0.9993 |
| S15 | spherical | infinite | 0.2100 | 1.52 | 64.17 | | |
| S16 | spherical | infinite | 0.2297 | | | | |
| S17 | spherical | infinite | infinite | | | | |

In this example, a total effective focal length f of the optical imaging system satisfies f=5.31 mm, a distance TTL along the optical axis from the object-side surface S1 of the first lens E1 to the imaging plane S17 satisfies TTL=7.90 mm, half of a diagonal length ImgH of an effective pixel area on the imaging plane S17 satisfies ImgH=6.54 mm, half of a maximal field-of-view HFOV of the optical imaging system satisfies HFOV=50.15°, and an aperture number Fno of the optical imaging system satisfies Fno=1.99.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \tag{1}$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1-S14 of the optical imaging system according to example 1.

TABLE 2

| Surface number | A4 | A6 | A8 | A10 | A12 |
|---|---|---|---|---|---|
| S1 | 1.2049E−02 | 4.4195E−03 | −3.8275E−03 | 2.9082E−03 | −1.6955E−03 |
| S2 | 1.7724E−02 | 1.7620E−02 | −2.7267E−02 | 2.9024E−02 | −2.0353E−02 |
| S3 | −2.7026E−02 | 3.5684E−02 | −5.7808E−02 | 6.6149E−02 | −5.1697E−02 |
| S4 | −3.3063E−02 | 6.3851E−03 | 4.1109E−04 | −5.7932E−03 | 6.2073E−03 |
| S5 | −1.7624E−02 | −2.2752E−03 | −1.2047E−02 | 2.7231E−02 | −3.6562E−02 |
| S6 | −1.4441E−02 | −2.4515E−02 | 4.7033E−02 | −7.0838E−02 | 6.7239E−02 |
| S7 | 1.0891E−02 | −2.4582E−02 | −1.0982E−02 | 4.9382E−02 | −5.0262E−02 |
| S8 | 7.2771E−02 | −1.2806E−01 | 8.2285E−02 | −3.0487E−02 | 6.5445E−03 |
| S9 | 9.6125E−02 | −9.9371E−02 | 5.9667E−02 | −2.5431E−02 | 7.6993E−03 |
| S10 | −1.6861E−02 | 2.4840E−02 | −1.2680E−02 | 2.3858E−03 | 1.7365E−04 |
| S11 | 1.8318E−02 | −1.6947E−02 | 4.3775E−03 | −7.7993E−04 | 1.2613E−04 |
| S12 | 3.4531E−02 | −2.7887E−02 | 8.1456E−03 | −1.4478E−03 | 1.6658E−04 |
| S13 | −8.5865E−02 | 4.5897E−03 | 1.3269E−03 | −2.9288E−04 | 2.9022E−05 |
| S14 | −1.0189E−01 | 1.8888E−02 | −2.5282E−03 | 2.2928E−04 | −1.3680E−05 |

| Surface number | A14 | A16 | A18 | A20 |
|---|---|---|---|---|
| S1 | 6.2950E−04 | −1.4390E−04 | 1.8417E−05 | −1.0064E−06 |
| S2 | 9.1425E−03 | −2.5468E−03 | 3.9875E−04 | −2.6653E−05 |
| S3 | 2.6400E−02 | −8.3964E−03 | 1.4897E−03 | −1.0708E−04 |
| S4 | −3.2196E−03 | 9.4910E−04 | −1.7526E−04 | 3.2909E−05 |

TABLE 2-continued

| | | | | |
|---|---|---|---|---|
| S5 | 2.8973E−02 | −1.3403E−02 | 3.3353E−03 | −3.3559E−04 |
| S6 | −4.0710E−02 | 1.5225E−02 | −3.2113E−03 | 2.9295E−04 |
| S7 | 2.7647E−02 | −8.7228E−03 | 1.4760E−03 | −1.0328E−04 |
| S8 | −5.2738E−04 | −8.3303E−05 | 2.1719E−05 | −1.3127E−06 |
| S9 | −1.6100E−03 | 2.1922E−04 | −1.7415E−05 | 6.1060E−07 |
| S10 | −1.6439E−04 | 3.0934E−05 | −2.5867E−06 | 8.3232E−08 |
| S11 | −1.9037E−05 | 1.9823E−06 | −1.1073E−07 | 2.4635E−09 |
| S12 | −1.2560E−05 | 6.0279E−07 | −1.6706E−08 | 2.0278E−10 |
| S13 | −1.6950E−06 | 5.9830E−08 | −1.1842E−09 | 1.0128E−11 |
| S14 | 5.2274E−07 | −1.2111E−08 | 1.5033E−10 | −7.1859E−13 |

Figures 2A, 2B:
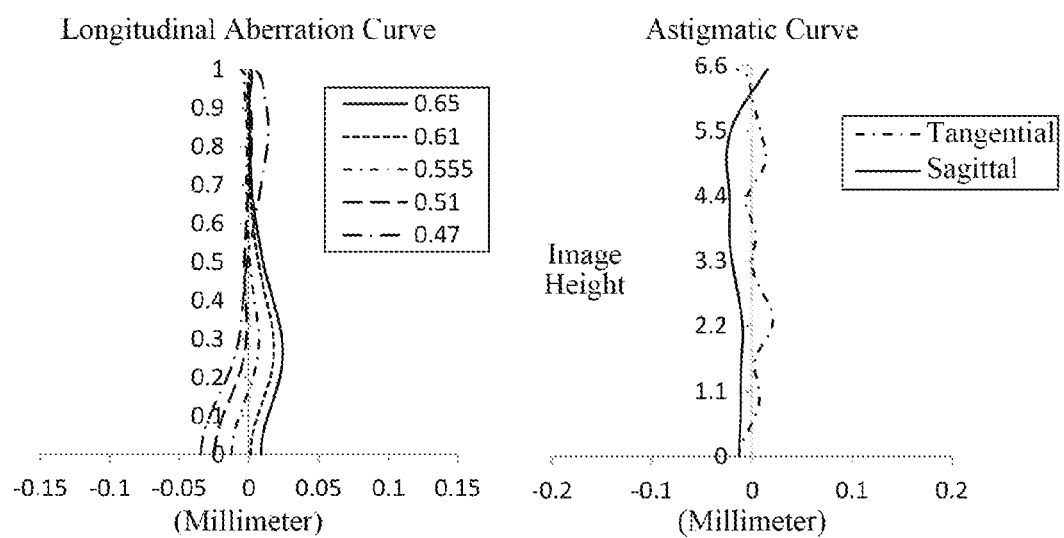

FIG. 2A illustrates a longitudinal aberration curve of the optical imaging system according to example 1, representing differences in the position of the image formed by the lens assembly for light with various wavelengths. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion at different image heights. FIG. 2D illustrates a lateral color curve of the optical imaging system according to example 1, representing deviations of different image heights on an imaging plane after light passes through the lens assembly. It can be seen from FIG. 2A to FIG. 2D that the optical imaging system provided in example 1 may achieve a good image quality.

Example 2

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system satisfies f=5.36 mm, a distance TTL along the optical axis from the object-side surface S1 of the first lens E1 to the imaging plane S17 satisfies TTL=7.89 mm, half of a diagonal length ImgH of an effective pixel area on the imaging plane S17 satisfies ImgH=6.54 mm, half of a maximal field-of-view HFOV of the optical imaging system satisfies HFOV=50.45°, and an aperture number Fno of the optical imaging system satisfies Fno=1.99.

Table 3 shows a table of basic parameters of the optical imaging system in example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | spherical | infinite | infinite | | | | |
| S1 | aspheric | −7.5075 | 0.3000 | 1.68 | 19.24 | −72.56 | −88.2698 |
| S2 | aspheric | −9.0034 | 0.0300 | | | | −99.0000 |
| S3 | aspheric | 2.9641 | 0.5535 | 1.55 | 56.11 | 10.72 | 0.3291 |
| S4 | aspheric | 5.6102 | 0.1786 | | | | 3.1803 |
| STO | spherical | infinite | 0.3203 | | | | |
| S5 | aspheric | 65.5921 | 0.8500 | 1.55 | 56.11 | 7.37 | −99.0000 |
| S6 | aspheric | −4.2680 | 1.1194 | | | | 0.2852 |
| S7 | aspheric | −2.0029 | 0.3000 | 1.68 | 19.24 | −6.59 | 0.0365 |
| S8 | aspheric | −3.8541 | 0.0300 | | | | 0.5020 |
| S9 | aspheric | −16.4549 | 0.7107 | 1.55 | 56.11 | −549.94 | −95.2998 |

TABLE 3-continued

| | | | | Material | | | |
|---|---|---|---|---|---|---|---|
| Surface number | Surface type | Radius of curvature | Thickness/ Distance | Refractive index | Abbe number | Focal length | Conic coefficient |
| S10 | aspheric | −17.6746 | 0.0300 | | | | 34.3725 |
| S11 | aspheric | 2.3010 | 0.4961 | 1.67 | 20.37 | 7.27 | −4.7890 |
| S12 | aspheric | 4.0061 | 0.8295 | | | | −0.4202 |
| S13 | aspheric | 2.2289 | 0.7661 | 1.54 | 55.87 | −14.65 | −0.9623 |
| S14 | aspheric | 1.5281 | 0.8862 | | | | −0.9972 |
| S15 | spherical | infinite | 0.2100 | 1.52 | 64.17 | | |
| S16 | spherical | infinite | 0.2769 | | | | |
| S17 | spherical | infinite | infinite | | | | |

TABLE 4

| Surface number | A4 | A6 | A8 | A10 | A12 |
|---|---|---|---|---|---|
| S1 | 9.6452E−03 | 8.4842E−03 | −7.3186E−03 | 4.8511E−03 | −2.4250E−03 |
| S2 | 1.9380E−02 | 1.5772E−02 | −2.3513E−02 | 2.5085E−02 | −1.7780E−02 |
| S3 | −2.2751E−02 | 2.6210E−02 | −4.3095E−02 | 5.0654E−02 | −4.0373E−02 |
| S4 | −3.1664E−02 | 8.4116E−03 | −6.1857E−03 | 6.5401E−03 | −7.1679E−03 |
| S5 | −1.7576E−02 | −6.7068E−03 | 6.9548E−03 | −1.2446E−02 | 1.2709E−02 |
| S6 | −1.7481E−02 | −1.2124E−02 | 1.9217E−02 | −2.7584E−02 | 2.4722E−02 |
| S7 | 4.3814E−03 | −3.5164E−02 | 2.8693E−02 | −7.1867E−03 | −3.8324E−03 |
| S8 | 1.0663E−01 | −1.8532E−01 | 1.4045E−01 | −7.0143E−02 | 2.4500E−02 |
| S9 | 1.4707E−01 | −1.6849E−01 | 1.2105E−01 | −6.1632E−02 | 2.1583E−02 |
| S10 | −6.9484E−02 | 6.4131E−02 | −2.8722E−02 | 6.3305E−03 | −5.1972E−04 |
| S11 | 1.6936E−02 | −1.4269E−02 | 7.5337E−03 | 1.4586E−03 | −6.1109E−04 |
| S12 | 4.6531E−02 | −4.5823E−02 | 1.6784E−02 | −3.7691E−03 | 5.4256E−04 |
| S13 | −9.3897E−02 | 9.6134E−03 | −1.7507E−04 | −5.1848E−05 | 6.2891E−06 |
| S14 | −1.0007E−01 | 2.0126E−02 | −2.9121E−03 | 2.9079E−04 | −1.9684E−05 |

| Surface number | A14 | A16 | A18 | A20 |
|---|---|---|---|---|
| S1 | 8.0880E−04 | −1.7018E−04 | 2.0263E−05 | −1.0347E−06 |
| S2 | 8.0685E−03 | −2.2630E−03 | 3.5436E−04 | −2.3533E−05 |
| S3 | 2.0808E−02 | −6.5831E−03 | 1.1377E−03 | −7.7021E−05 |
| S4 | 5.5525E−03 | −2.3914E−03 | 4.7970E−04 | −1.8235E−05 |
| S5 | −8.3064E−03 | 3.4222E−03 | −8.2900E−04 | 9.5163E−05 |
| S6 | −1.4080E−02 | 4.9223E−03 | −9.6675E−04 | 8.1688E−05 |
| S7 | 4.5716E−03 | −1.8682E−03 | 3.5531E−04 | −2.5836E−05 |
| S8 | −5.7793E−03 | 8.6710E−04 | −7.4987E−05 | 2.9078E−06 |
| S9 | −5.0490E−03 | 7.5060E−04 | −6.4031E−05 | 2.3823E−06 |
| S10 | −6.2941E−05 | 1.8632E−05 | −1.5991E−06 | 4.7751E−08 |
| S11 | 1.1785E−04 | −1.2467E−05 | 7.0065E−07 | −1.6396E−08 |
| S12 | −5.0096E−05 | 2.8673E−06 | −9.2469E−08 | 1.2819E−09 |
| S13 | −3.9494E−07 | 1.5648E−08 | −3.6951E−10 | 3.9361E−12 |
| S14 | 8.8033E−07 | −2.4789E−08 | 3.9681E−10 | −2.7479E−12 |

Figure 4A:
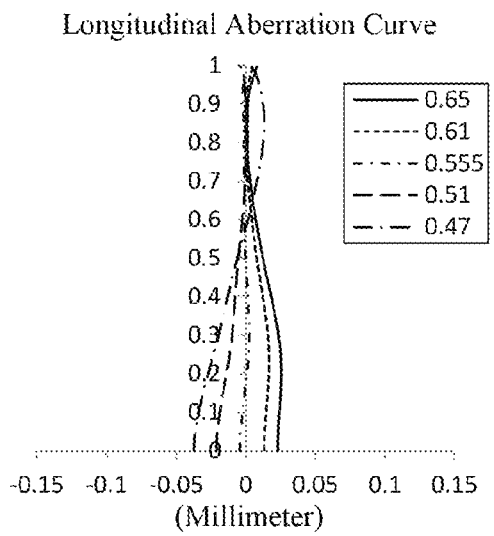
FIGS. 4A to 4D illustrate a longitudinal aberration curve, an astigmatic curve, a distortion curve and a lateral color curve of the optical imaging system of the Example 2, respectively.
Figure 4B:
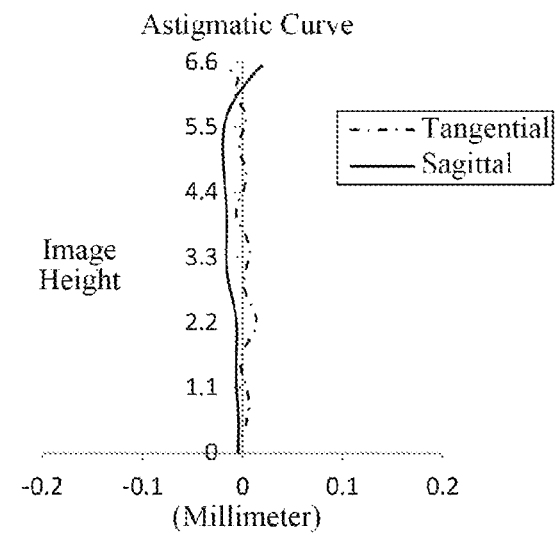
Figure 4C:
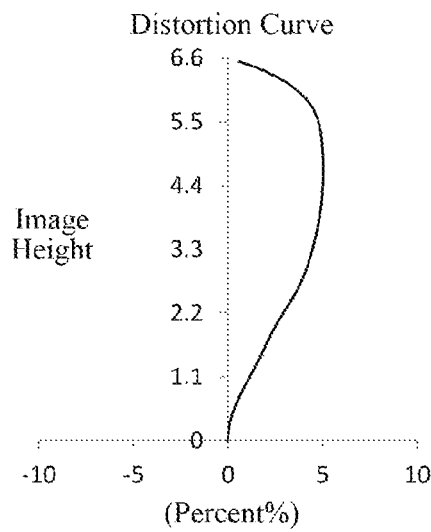
Figure 4D:
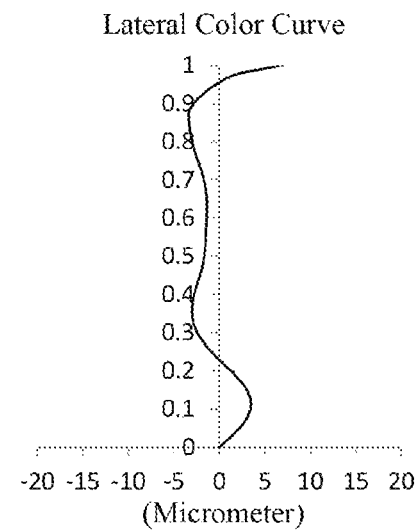

FIG. 4A illustrates a longitudinal aberration curve of the optical imaging system according to example 2, representing differences in the position of the image formed by the lens assembly for light with various wavelengths. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion at different image heights. FIG. 4D illustrates a lateral color curve of the optical imaging system according to example 2, representing deviations of different image heights on an imaging plane after light passes through the lens assembly. It can be seen from FIG. 4A to FIG. 4D that the optical imaging system provided in example 2 may achieve a good image quality.

Example 3

Figure 5:
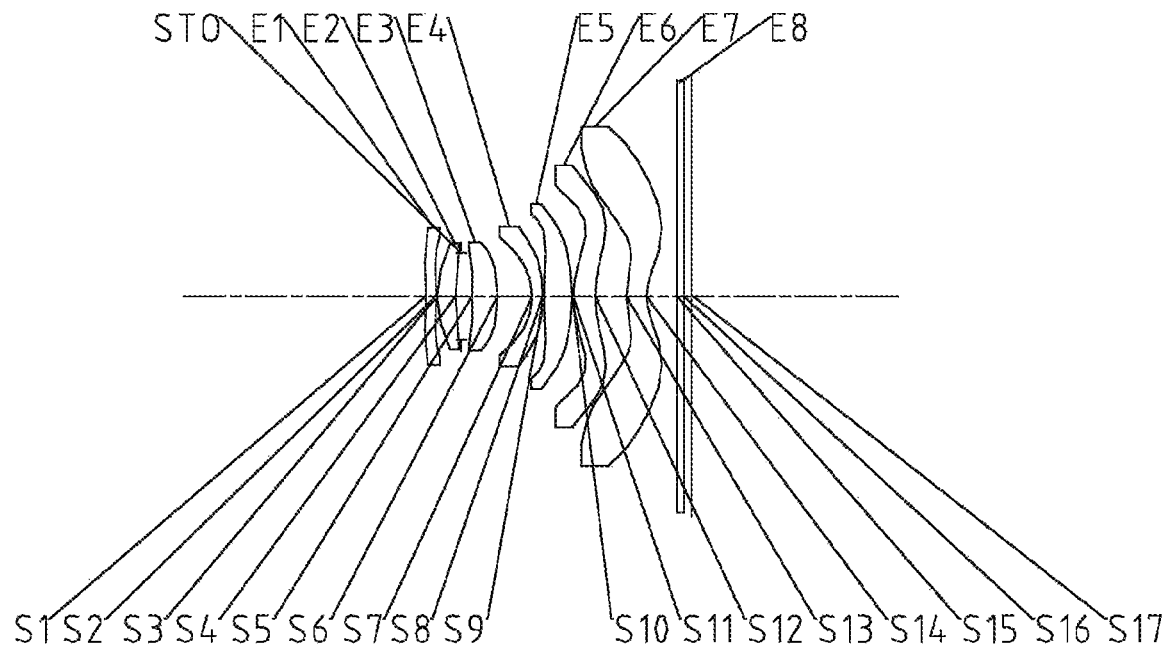
FIG. 5 illustrates a schematic structural view of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system satisfies f=5.26 mm, a distance TTL along the optical axis from the object-side surface S1 of the first lens E1 to the imaging plane S17 satisfies TTL=7.83 mm, half of a diagonal length ImgH of an effective pixel area on the imaging plane S17 satisfies ImgH=6.39 mm, half of a maximal field-of-view HFOV of the optical imaging system satisfies HFOV=49.45°, and an aperture number Fno of the optical imaging system satisfies Fno=1.99.

Table 5 shows a table of basic parameters of the optical imaging system in example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Refractive index | Abbe number | Focal length | Conic coefficient |
|---|---|---|---|---|---|---|---|
| OBJ | spherical | infinite | infinite | | | | |
| S1 | aspheric | −8.9046 | 0.3052 | 1.68 | 19.24 | 649.99 | −95.1168 |
| S2 | aspheric | −8.8490 | 0.0300 | | | | −80.9517 |
| S3 | aspheric | 3.0253 | 0.5381 | 1.55 | 56.11 | 12.30 | 0.3195 |
| S4 | aspheric | 5.1588 | 0.1668 | | | | 1.9832 |
| STO | spherical | infinite | 0.3226 | | | | |
| S5 | aspheric | 35.6206 | 0.7498 | 1.55 | 56.11 | 8.10 | −24.9483 |
| S6 | aspheric | −5.0106 | 1.0212 | | | | 1.0029 |
| S7 | aspheric | −1.9872 | 0.3129 | 1.68 | 19.24 | −5.72 | 0.0347 |
| S8 | aspheric | −4.3350 | 0.0300 | | | | 0.7468 |
| S9 | aspheric | −76.1427 | 0.8380 | 1.55 | 56.11 | 11.49 | 99.0000 |
| S10 | aspheric | −5.8189 | 0.0306 | | | | 1.1061 |
| S11 | aspheric | 2.8562 | 0.6502 | 1.67 | 20.37 | 9.51 | −4.2080 |
| S12 | aspheric | 4.7259 | 0.9156 | | | | −0.2225 |
| S13 | aspheric | 2.3484 | 0.5926 | 1.54 | 55.87 | −9.72 | −0.9406 |
| S14 | aspheric | 1.4766 | 0.8975 | | | | −0.9957 |
| S15 | spherical | infinite | 0.2100 | 1.52 | 64.17 | | |
| S16 | spherical | infinite | 0.2177 | | | | |
| S17 | spherical | infinite | infinite | | | | |

TABLE 6

| Surface number | A4 | A6 | A8 | A10 | A12 |
|---|---|---|---|---|---|
| S1 | 1.1622E−02 | 4.8485E−03 | −4.1416E−03 | 3.1404E−03 | −1.7888E−03 |
| S2 | 1.8386E−02 | 1.4251E−02 | −2.1987E−02 | 2.4172E−02 | −1.7435E−02 |
| S3 | −2.0507E−02 | 2.4893E−02 | −4.4659E−02 | 5.5224E−02 | −4.6564E−02 |
| S4 | −3.4481E−02 | 9.8516E−03 | −1.0789E−02 | 1.7759E−02 | −2.5198E−02 |
| S5 | −1.7408E−02 | −4.0223E−03 | −4.0469E−03 | 1.0075E−02 | −1.4941E−02 |
| S6 | −1.5647E−02 | −1.8525E−02 | 3.1288E−02 | −4.5166E−02 | 4.1219E−02 |
| S7 | 9.9403E−03 | −3.0362E−02 | 7.7075E−03 | 2.4225E−02 | −3.1330E−02 |
| S8 | 7.4958E−02 | −1.3638E−01 | 9.5207E−02 | −4.1286E−02 | 1.1872E−02 |
| S9 | 1.0080E−01 | −1.0927E−01 | 7.0133E−02 | −3.2096E−02 | 1.0323E−02 |
| S10 | −1.8248E−02 | 2.5958E−02 | −1.3301E−02 | 2.8057E−03 | −4.1572E−05 |
| S11 | 2.0343E−02 | −1.8898E−02 | 4.8185E−03 | −7.3804E−04 | 8.5341E−05 |
| S12 | 3.7917E−02 | −3.1732E−02 | 9.5894E−03 | −1.7598E−03 | 2.0939E−04 |
| S13 | −9.0634E−02 | 4.8792E−03 | 1.5177E−03 | −3.4305E−04 | 3.5039E−05 |
| S14 | −1.0671E−01 | 2.0044E−02 | −2.6541E−03 | 2.3640E−04 | −1.3842E−05 |

| Surface number | A14 | A16 | A18 | A20 |
|---|---|---|---|---|
| S1 | 6.4918E−04 | −1.4648E−04 | 1.8726E−05 | −1.0324E−06 |
| S2 | 8.0266E−03 | −2.2959E−03 | 3.6987E−04 | −2.5453E−05 |
| S3 | 2.5747E−02 | −8.9593E−03 | 1.7655E−03 | −1.4516E−04 |

TABLE 6-continued

| | | | | |
|---|---|---|---|---|
| S4 | 2.3198E−02 | −1.2636E−02 | 3.7202E−03 | −4.4442E−04 |
| S5 | 1.2539E−02 | −6.0045E−03 | 1.5165E−03 | −1.4894E−04 |
| S6 | −2.4136E−02 | 8.7705E−03 | −1.8065E−03 | 1.6162E−04 |
| S7 | 1.9142E−02 | −6.4739E−03 | 1.1553E−03 | −8.4360E−05 |
| S8 | −2.1260E−03 | 2.0231E−04 | −6.0576E−06 | −1.8841E−07 |
| S9 | −2.2634E−03 | 3.2020E−04 | −2.6296E−05 | 9.5042E−07 |
| S10 | −1.0338E−04 | 2.1652E−05 | −1.8668E−06 | 6.0752E−08 |
| S11 | −1.0151E−05 | 1.0221E−06 | −5.7818E−08 | 1.2768E−09 |
| S12 | −1.6395E−05 | 8.2071E−07 | −2.3794E−08 | 3.0245E−10 |
| S13 | −2.1127E−06 | 7.7037E−08 | −1.5748E−09 | 1.3891E−11 |
| S14 | 5.1939E−07 | −1.1844E−08 | 1.4573E−10 | −7.0607E−13 |

Figure 6A:
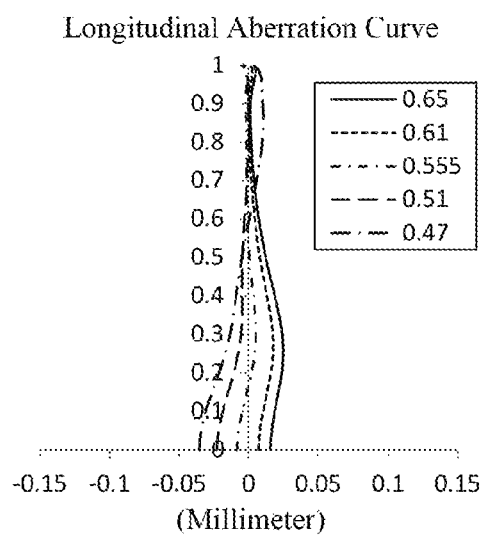
FIGS. 6A to 6D illustrate a longitudinal aberration curve, an astigmatic curve, a distortion curve and a lateral color curve of the optical imaging system of the Example 3, respectively.
Figure 6B:
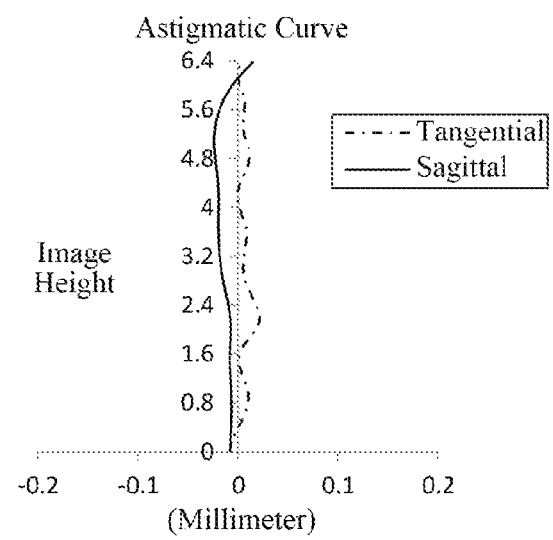
Figures 6C, 6D:
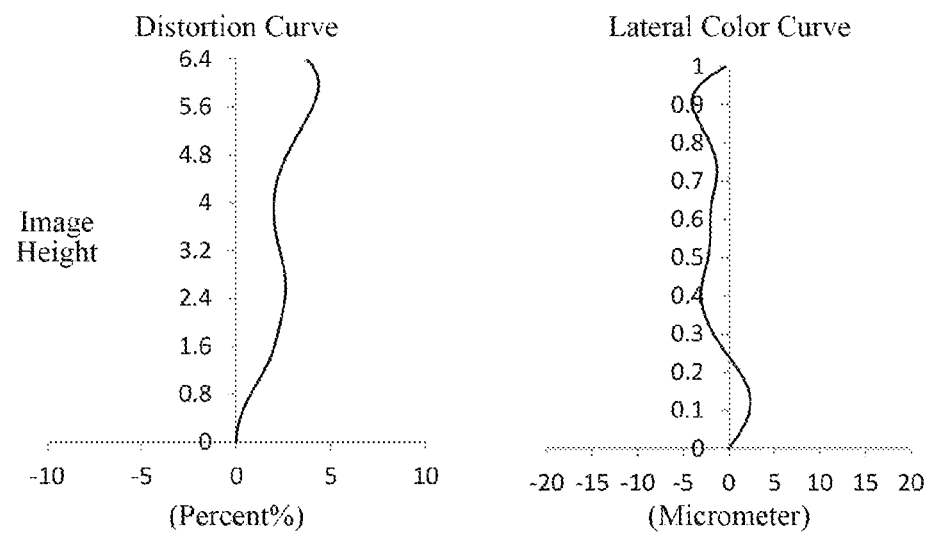

FIG. 6A illustrates a longitudinal aberration curve of the optical imaging system according to example 3, representing differences in the position of the image formed by the lens assembly for light with various wavelengths. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion at different image heights. FIG. 6D illustrates a lateral color curve of the optical imaging system according to example 3, representing deviations of different image heights on an imaging plane after light passes through the lens assembly. It can be seen from FIG. 6A to FIG. 6D that the optical imaging system provided in example 3 may achieve a good image quality.

Example 4

Figure 7:
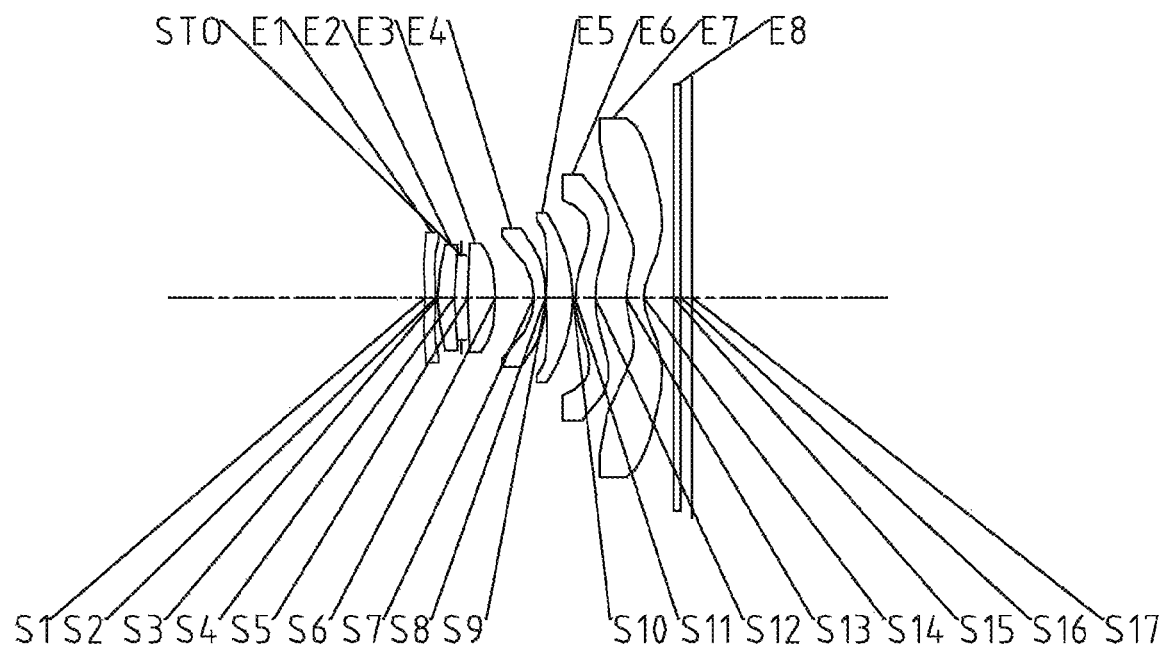
FIG. 7 illustrates a schematic structural view of an optical imaging system according to Example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a positive refractive power. An object-side surface S1 of the first lens E1 is a concave surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system satisfies f=5.02 mm, a distance TTL along the optical axis from the object-side surface S1 of the first lens E1 to the imaging plane S17 satisfies TTL=7.90 mm, half of a diagonal length ImgH of an effective pixel area on the imaging plane S17 satisfies ImgH=6.54 mm, half of a maximal field-of-view HFOV of the optical imaging system satisfies HFOV=50.31°, and an aperture number Fno of the optical imaging system satisfies Fno=1.99.

Table 7 shows a table of basic parameters of the optical imaging system in example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | spherical | infinite | infinite | | | | |
| S1 | aspheric | −6.7168 | 0.3201 | 1.68 | 19.24 | 30.67 | −84.4311 |
| S2 | aspheric | −5.1737 | 0.0553 | | | | −99.0000 |
| S3 | aspheric | 4.8046 | 0.4886 | 1.55 | 56.11 | −460.01 | 1.3978 |
| S4 | aspheric | 4.5451 | 0.2096 | | | | 0.0163 |
| STO | spherical | infinite | 0.1897 | | | | |
| S5 | aspheric | 8.2214 | 0.8198 | 1.55 | 56.11 | 5.96 | 23.3910 |
| S6 | aspheric | −5.1919 | 1.1391 | | | | −2.0670 |
| S7 | aspheric | −2.0047 | 0.3389 | 1.68 | 19.24 | −5.78 | 0.0196 |
| S8 | aspheric | −4.3903 | 0.0300 | | | | 1.0136 |
| S9 | aspheric | −19.8296 | 0.7810 | 1.55 | 56.11 | 10.79 | 33.5262 |
| S10 | aspheric | −4.6043 | 0.0748 | | | | −0.7680 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S11 | aspheric | 2.6397 | 0.5871 | 1.67 | 20.37 | 9.51 | −4.1914 |
| S12 | aspheric | 4.1213 | 0.9107 | | | | −0.4270 |
| S13 | aspheric | 1.8807 | 0.5233 | 1.54 | 55.87 | −11.79 | −0.9972 |
| S14 | aspheric | 1.3090 | 0.8874 | | | | −0.9939 |
| S15 | spherical | infinite | 0.2100 | 1.52 | 64.17 | | |
| S16 | spherical | infinite | 0.3361 | | | | |
| S17 | spherical | infinite | infinite | | | | |

TABLE 8

| Surface number | A4 | A6 | A8 | A10 | A12 |
|---|---|---|---|---|---|
| S1 | 3.9842E−03 | 2.1668E−02 | −2.1948E−02 | 1.5922E−02 | −8.1137E−03 |
| S2 | 1.5274E−02 | 1.9110E−02 | −1.9459E−02 | 1.7006E−02 | −1.1029E−02 |
| S3 | 3.6990E−02 | −1.1518E−01 | 1.7889E−01 | −1.9244E−01 | 1.4076E−01 |
| S4 | −5.1244E−02 | 1.2477E−02 | 1.9295E−02 | −6.6400E−02 | 9.6042E−02 |
| S5 | −1.6603E−02 | −4.0201E−03 | 5.6389E−04 | −5.7330E−04 | −1.9123E−03 |
| S6 | −1.4153E−02 | −1.0278E−02 | 1.6228E−02 | −2.6335E−02 | 2.6071E−02 |
| S7 | 7.9365E−03 | −3.0595E−02 | 1.6860E−02 | 5.5535E−03 | −1.1365E−02 |
| S8 | 7.5543E−02 | −1.3190E−01 | 8.5313E−02 | −3.4285E−02 | 9.5397E−03 |
| S9 | 9.9108E−02 | −1.0219E−01 | 6.1192E−02 | −2.6173E−02 | 7.9931E−03 |
| S10 | −4.3624E−02 | 4.5745E−02 | −1.9945E−02 | 3.5880E−03 | 1.8851E−04 |
| S11 | 2.3975E−02 | −1.6016E−02 | 2.7652E−05 | 2.0030E−03 | −7.5763E−04 |
| S12 | 5.9828E−02 | −5.0112E−02 | 1.7345E−02 | −3.7258E−03 | 5.2345E−04 |
| S13 | −8.7968E−02 | 4.0350E−03 | 1.7379E−03 | −3.7674E−04 | 3.7492E−05 |
| S14 | −1.1574E−01 | 2.1345E−02 | −2.7138E−03 | 2.3530E−04 | −1.3756E−05 |

| Surface number | A14 | A16 | A18 | A20 |
|---|---|---|---|---|
| S1 | 2.7064E−03 | −5.6073E−04 | 6.5156E−05 | −3.2340E−06 |
| S2 | 4.6131E−03 | −1.1706E−03 | 1.5998E−04 | −8.5950E−06 |
| S3 | −6.8814E−02 | 2.1433E−02 | −3.8287E−03 | 2.9929E−04 |
| S4 | −8.0231E−02 | 3.9733E−02 | −1.0784E−02 | 1.2416E−03 |
| S5 | 3.0100E−03 | −1.9493E−03 | 6.0621E−04 | −7.1351E−05 |
| S6 | −1.6427E−02 | 6.3711E−03 | −1.3890E−03 | 1.3103E−04 |
| S7 | 6.7826E−03 | −2.0592E−03 | 3.1962E−04 | −1.9842E−05 |
| S8 | −1.8549E−03 | 2.5069E−04 | −2.2512E−05 | 1.0544E−06 |
| S9 | −1.6878E−03 | 2.3146E−04 | −1.8412E−05 | 6.4132E−07 |
| S10 | −2.1426E−04 | 4.1153E−05 | −3.5050E−06 | 1.1494E−07 |
| S11 | 1.4138E−04 | −1.4913E−05 | 8.4473E−07 | −1.9873E−08 |
| S12 | −4.8210E−05 | 2.7991E−06 | −9.2536E−08 | 1.3222E−09 |
| S13 | −2.1814E−06 | 7.6101E−08 | −1.4806E−09 | 1.2388E−11 |
| S14 | 5.3192E−07 | −1.3055E−08 | 1.8486E−10 | −1.1559E−12 |

Figure 8A:
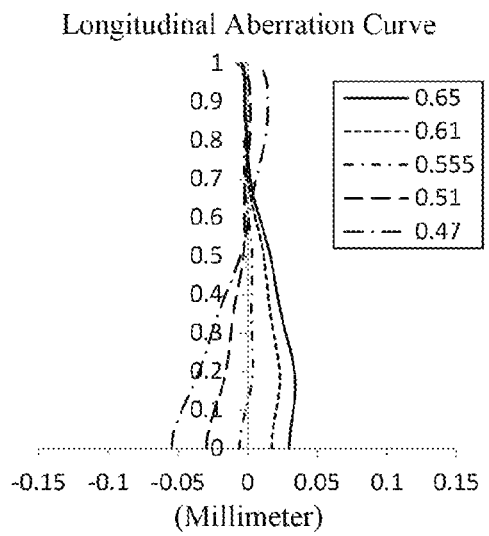
FIGS. 8A to 8D illustrate a longitudinal aberration curve, an astigmatic curve, a distortion curve and a lateral color curve of the optical imaging system of the Example 4, respectively.
Figure 8B:
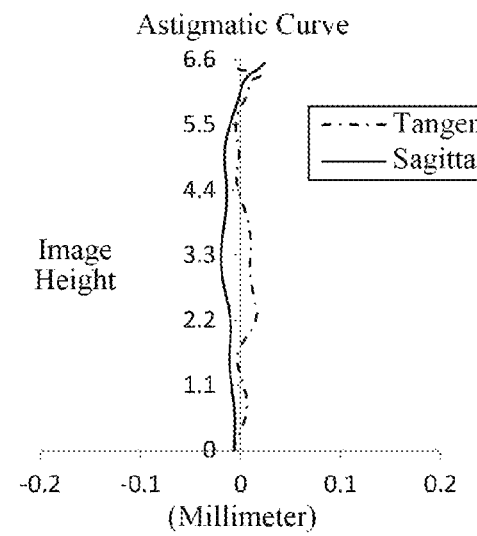
Figure 8C:
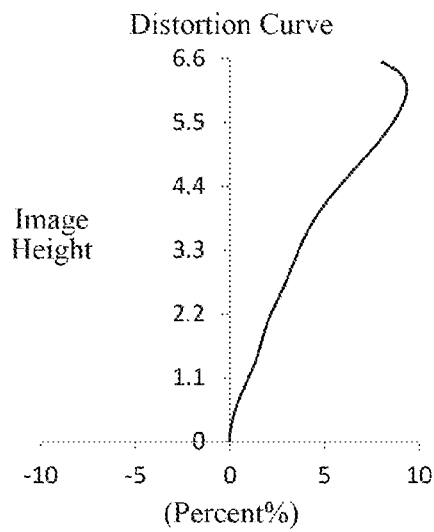
Figure 8D:
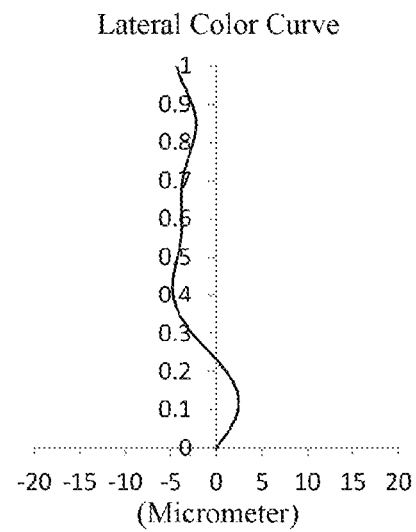

FIG. 8A illustrates a longitudinal aberration curve of the optical imaging system according to example 4, representing differences in the position of the image formed by the lens assembly for light with various wavelengths. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion at different image heights. FIG. 8D illustrates a lateral color curve of the optical imaging system according to example 4, representing deviations of different image heights on an imaging plane after light passes through the lens assembly. It can be seen from FIG. 8A to FIG. 8D that the optical imaging system provided in example 4 may achieve a good image quality.

Example 5

Figure 9:
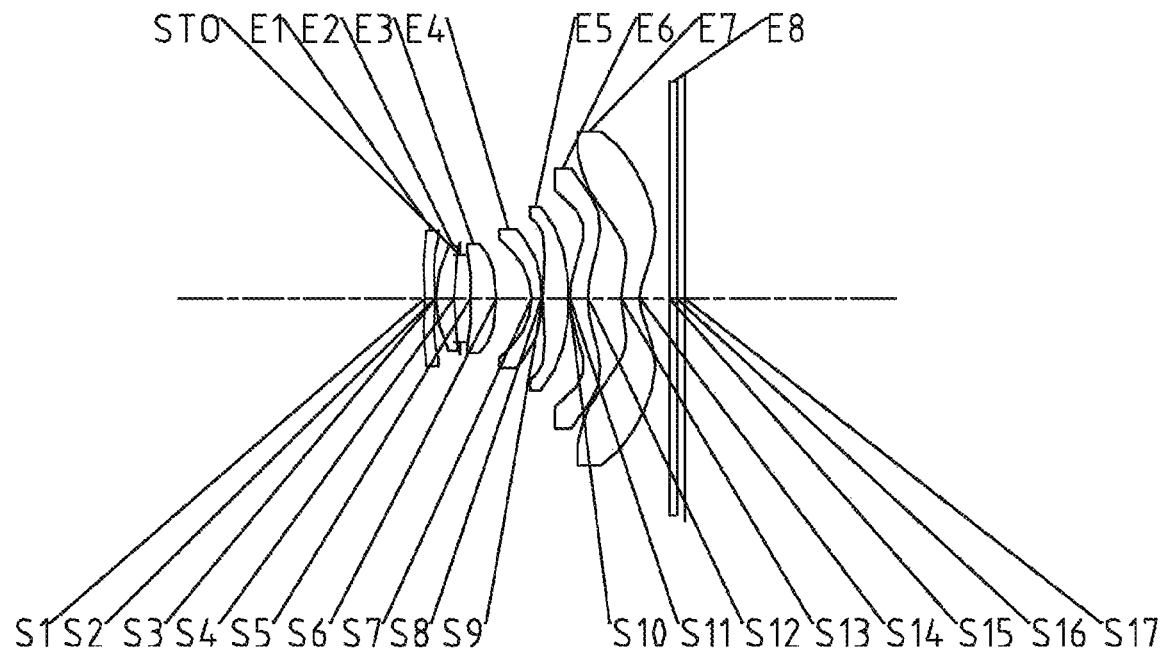
FIG. 9 illustrates a schematic structural view of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system satisfies f=5.21 mm, a distance TTL along the optical axis from the object-side surface S1 of the first lens E1 to the imaging plane S17 satisfies TTL=7.70 mm, half of a diagonal length ImgH of an effective pixel area on the imaging plane S17 satisfies ImgH=6.54 mm, half of a maximal field-of-view HFOV of the optical imaging system satisfies HFOV=50.32°, and an aperture number Fno of the optical imaging system satisfies Fno=1.99.

Table 9 shows a table of basic parameters of the optical imaging system in example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | −7.5406 | 0.3000 | 1.68 | 19.24 | −107.85 | −90.4932 |
| S2 | aspheric | −8.5433 | 0.0300 | | | | −92.3017 |
| S3 | aspheric | 2.9138 | 0.5369 | 1.55 | 56.11 | 11.03 | 0.2822 |
| S4 | aspheric | 5.2784 | 0.1674 | | | | 2.5276 |
| STO | spherical | infinite | 0.3219 | | | | |
| S5 | aspheric | 43.2090 | 0.7610 | 1.55 | 56.11 | 7.95 | −99.0000 |
| S6 | aspheric | −4.7958 | 1.0443 | | | | 0.9514 |
| S7 | aspheric | −1.9912 | 0.3000 | 1.68 | 19.24 | −5.80 | 0.0319 |
| S8 | aspheric | −4.2850 | 0.0300 | | | | 0.9308 |
| S9 | aspheric | −96.3490 | 0.7756 | 1.55 | 56.11 | 11.72 | 99.0000 |
| S10 | aspheric | −6.0193 | 0.0300 | | | | 0.9335 |
| S11 | aspheric | 2.6396 | 0.5441 | 1.67 | 20.37 | 9.51 | −3.9334 |
| S12 | aspheric | 4.1505 | 0.9689 | | | | −0.3386 |
| S13 | aspheric | 2.1855 | 0.5585 | 1.54 | 55.87 | −9.87 | −0.9499 |
| S14 | aspheric | 1.4093 | 0.8839 | | | | −0.9966 |
| S15 | spherical | infinite | 0.2100 | 1.52 | 64.17 | | |
| S16 | spherical | infinite | 0.2374 | | | | |
| S17 | spherical | infinite | infinite | | | | |

TABLE 10

| Surface number | A4 | A6 | A8 | A10 | A12 |
|---|---|---|---|---|---|
| S1 | 9.5439E−03 | 8.8811E−03 | −7.9197E−03 | 5.4746E−03 | −2.8282E−03 |
| S2 | 1.8313E−02 | 1.6857E−02 | −2.5070E−02 | 2.6749E−02 | −1.9133E−02 |
| S3 | −2.3900E−02 | 2.6962E−02 | −4.3474E−02 | 4.9968E−02 | −3.9650E−02 |
| S4 | −3.4457E−02 | 1.2399E−02 | −1.8398E−02 | 3.2973E−02 | −4.4098E−02 |
| S5 | −1.7452E−02 | −7.1607E−03 | 5.8246E−03 | −8.8640E−03 | 7.1372E−03 |
| S6 | −1.6713E−02 | −1.4605E−02 | 2.2701E−02 | −3.3158E−02 | 3.0576E−02 |
| S7 | 1.0938E−02 | −2.9685E−02 | 7.7449E−03 | 2.3497E−02 | −3.0366E−02 |
| S8 | 7.6178E−02 | −1.4298E−01 | 1.0256E−01 | −4.6059E−02 | 1.3963E−02 |
| S9 | 1.0418E−01 | −1.1493E−01 | 7.5932E−02 | −3.6190E−02 | 1.2164E−02 |
| S10 | −2.1681E−02 | 3.3797E−02 | −1.8643E−02 | 4.5996E−03 | −3.5654E−04 |
| S11 | 2.4706E−02 | −2.1220E−02 | 5.0098E−03 | −5.3011E−04 | −4.6776E−06 |
| S12 | 4.3701E−02 | −3.7699E−02 | 1.1949E−02 | −2.3010E−03 | 2.8633E−04 |
| S13 | −9.8476E−02 | 5.4459E−03 | 1.8083E−03 | −4.2335E−04 | 4.4844E−05 |
| S14 | −1.1575E−01 | 2.2600E−02 | −3.1238E−03 | 2.9516E−04 | −1.8759E−05 |

| Surface number | A14 | A16 | A18 | A20 |
|---|---|---|---|---|
| S1 | 9.6904E−04 | −2.0946E−04 | 2.5775E−05 | −1.3715E−06 |
| S2 | 8.8112E−03 | −2.5255E−03 | 4.0780E−04 | −2.8144E−05 |
| S3 | 2.0664E−02 | −6.7378E−03 | 1.2274E−03 | −8.9939E−05 |
| S4 | 3.7707E−02 | −1.9259E−02 | 5.3558E−03 | −6.0944E−04 |
| S5 | −3.3786E−03 | 9.0243E−04 | −1.3065E−04 | 1.6906E−05 |
| S6 | −1.8120E−02 | 6.6602E−03 | −1.3864E−03 | 1.2516E−04 |

TABLE 10-continued

| | | | | |
|---|---|---|---|---|
| S7 | 1.8397E−02 | −6.1483E−03 | 1.0824E−03 | −7.7947E−05 |
| S8 | −2.7552E−03 | 3.2641E−04 | −2.0481E−05 | 5.6202E−07 |
| S9 | −2.7819E−03 | 4.0880E−04 | −3.4726E−05 | 1.2937E−06 |
| S10 | −8.0399E−05 | 2.2528E−05 | −2.1109E−06 | 7.1679E−08 |
| S11 | 7.1014E−06 | −7.8397E−07 | 4.2914E−08 | −1.0750E−09 |
| S12 | −2.3292E−05 | 1.2025E−06 | −3.5758E−08 | 4.6505E−10 |
| S13 | −2.8023E−06 | 1.0589E−07 | −2.2455E−09 | 2.0588E−11 |
| S14 | 7.8575E−07 | −2.0760E−08 | 3.1306E−10 | −2.0546E−12 |

Figures 10A, 10B:
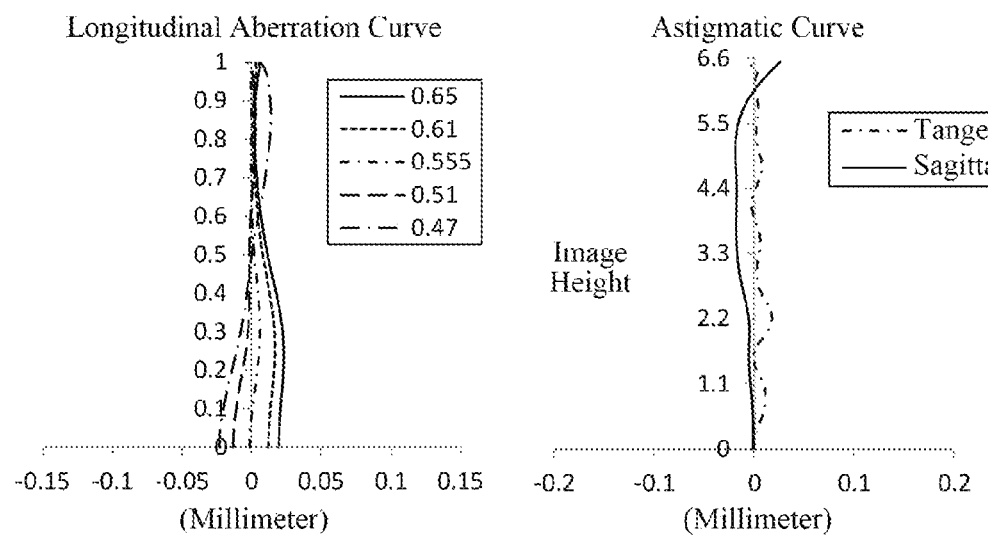

FIG. 10A illustrates a longitudinal aberration curve of the optical imaging system according to example 5, representing differences in the position of the image formed by the lens assembly for light with various wavelengths. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion at different image heights. FIG. 10D illustrates a lateral color curve of the optical imaging system according to example 5, representing deviations of different image heights on an imaging plane after light passes through the lens assembly. It can be seen from FIG. 10A to FIG. 10D that the optical imaging system provided in example 5 may achieve a good image quality.

Example 6

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system satisfies f=5.41 mm, a distance TTL along the optical axis from the object-side surface S1 of the first lens E1 to the imaging plane S17 satisfies TTL=8.18 mm, half of a diagonal length ImgH of an effective pixel area on the imaging plane S17 satisfies ImgH=6.54 mm, half of a maximal field-of-view HFOV of the optical imaging system satisfies HFOV=50.36°, and an aperture number Fno of the optical imaging system satisfies Fno=1.99.

Table 11 shows a table of basic parameters of the optical imaging system in example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

TABLE 11

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | spherical | infinite | infinite | | | | |
| S1 | aspheric | −8.4399 | 0.3000 | 1.68 | 19.24 | −74.30 | −99.0000 |
| S2 | aspheric | −10.2854 | 0.0300 | | | | −78.9215 |
| S3 | aspheric | 2.9602 | 0.5460 | 1.55 | 56.11 | 10.72 | 0.3166 |
| S4 | aspheric | 5.5994 | 0.1685 | | | | 3.6745 |
| STO | spherical | infinite | 0.3408 | | | | |
| S5 | aspheric | −400.0000 | 0.7882 | 1.55 | 56.11 | 8.46 | 99.0000 |
| S6 | aspheric | −4.5678 | 1.0832 | | | | 0.9502 |
| S7 | aspheric | −1.9976 | 0.3000 | 1.68 | 19.24 | −6.61 | 0.0270 |
| S8 | aspheric | −3.8240 | 0.0532 | | | | 0.1462 |
| S9 | aspheric | −371.7843 | 0.9344 | 1.55 | 56.11 | 9.00 | 99.0000 |
| S10 | aspheric | −4.8563 | 0.0749 | | | | 1.0477 |
| S11 | aspheric | 3.1600 | 0.6800 | 1.67 | 20.37 | 25.03 | −3.5828 |
| S12 | aspheric | 3.5630 | 0.8032 | | | | −1.7029 |
| S13 | aspheric | 2.2891 | 0.7200 | 1.54 | 55.87 | −13.49 | −0.9475 |

TABLE 11-continued

| Surface number | Surface type | Radius of curvature | Thickness/ Distance | Material Refractive index | Abbe number | Focal length | Conic coefficient |
|---|---|---|---|---|---|---|---|
| S14 | aspheric | 1.5483 | 0.8864 | | | | −0.9911 |
| S15 | spherical | infinite | 0.2100 | 1.52 | 64.17 | | |
| S16 | spherical | infinite | 0.2577 | | | | |
| S17 | spherical | infinite | infinite | | | | |

TABLE 12

| Surface number | A4 | A6 | A8 | A10 | A12 |
|---|---|---|---|---|---|
| S1 | 1.4916E−02 | 9.9144E−04 | −1.5853E−03 | 1.5139E−03 | −1.0065E−03 |
| S2 | 2.2317E−02 | 9.4673E−03 | −1.8517E−02 | 2.0829E−02 | −1.4829E−02 |
| S3 | −2.6878E−02 | 2.7931E−02 | −3.8088E−02 | 3.6650E−02 | −2.3188E−02 |
| S4 | −3.0406E−02 | 1.0099E−02 | −1.5544E−02 | 2.7498E−02 | −3.4465E−02 |
| S5 | −1.9479E−02 | −4.9809E−03 | −1.3152E−03 | 4.2803E−03 | −7.3570E−03 |
| S6 | −1.7925E−02 | −1.1469E−02 | 1.6110E−02 | −2.2284E−02 | 1.9357E−02 |
| S7 | 8.9501E−03 | −3.4801E−02 | 3.4980E−02 | −2.1294E−02 | 9.4425E−03 |
| S8 | 5.2723E−02 | −9.3335E−02 | 6.3415E−02 | −2.8994E−02 | 9.7475E−03 |
| S9 | 7.6626E−02 | −6.8287E−02 | 3.7623E−02 | −1.5485E−02 | 4.5672E−03 |
| S10 | 1.2172E−02 | 6.4074E−03 | −3.2486E−03 | −4.8200E−04 | 5.5202E−04 |
| S11 | 1.8030E−02 | −1.6984E−02 | 5.7802E−03 | −1.4911E−03 | 2.5702E−04 |
| S12 | 7.8008E−03 | −1.1356E−02 | 3.0914E−03 | −5.5505E−04 | 6.9681E−05 |
| S13 | −8.5172E−02 | 6.5949E−03 | 4.7830E−04 | −1.3564E−04 | 1.2574E−05 |
| S14 | −9.5238E−02 | 1.7739E−02 | −2.4315E−03 | 2.3081E−04 | −1.4704E−05 |
| Surface number | A14 | A16 | A18 | A20 | |
| S1 | 4.005 8E−04 | −9.6103E−05 | 1.2752E−05 | −7.1484E−07 | |
| S2 | 6.6743E−03 | −1.8527E−03 | 2.8817E−04 | −1.9084E−05 | |
| S3 | 8.8326E−03 | −1.6923E−03 | 4.9410E−05 | 2.5347E−05 | |
| S4 | 2.7159E−02 | −1.2603E−02 | 3.1279E−03 | −3.0690E−04 | |
| S5 | 6.2242E−03 | −2.8204E−03 | 6.2597E−04 | −4.5260E−05 | |
| S6 | −1.0787E−02 | 3.7197E−03 | −7.2670E−04 | 6.1449E−05 | |
| S7 | −2.4164E−03 | 2.5464E−04 | 9.0573E−06 | −2.3755E−06 | |
| S8 | −2.2658E−03 | 3.3355E−04 | −2.7817E−05 | 1.0295E−06 | |
| S9 | −9.2284E−04 | 1.2018E−04 | −9.0628E−06 | 3.0002E−07 | |
| S10 | −1.4632E−04 | 1.9161E−05 | −1.2741E−06 | 3.4233E−08 | |
| S11 | −2.7659E−05 | 1.7161E−06 | −5.3469E−08 | 5.9865E−10 | |
| S12 | −5.9881E−06 | 3.3163E−07 | −1.0539E−08 | 1.4493E−10 | |
| S13 | −6.5813E−07 | 2.0669E−08 | −3.6534E−10 | 2.8080E−12 | |
| S14 | 6.1288E−07 | −1.5985E−08 | 2.3652E−10 | −1.5161E−12 | |

Figure 12A:
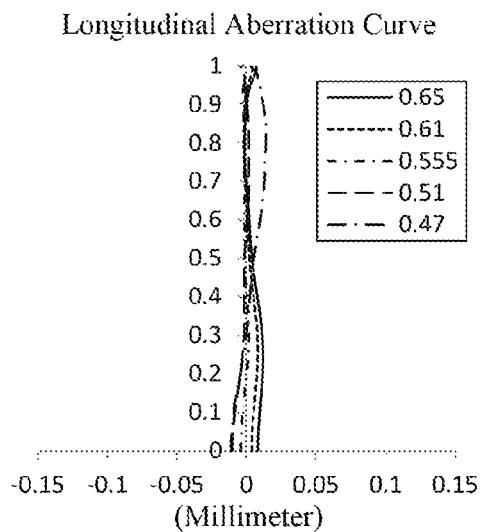
FIGS. 12A to 12D illustrate a longitudinal aberration curve, an astigmatic curve, a distortion curve and a lateral color curve of the optical imaging system of the Example 6, respectively.
Figure 12B:
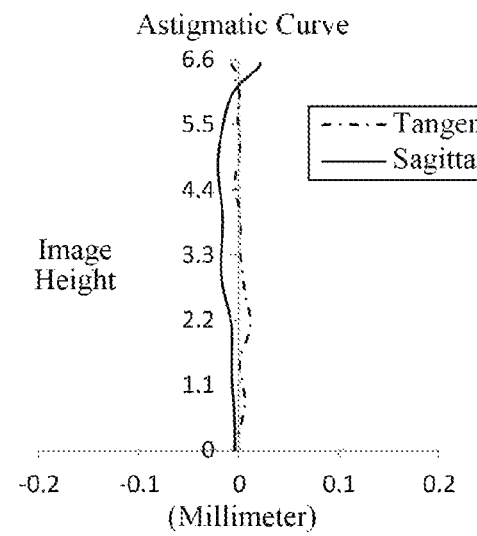
Figure 12C:
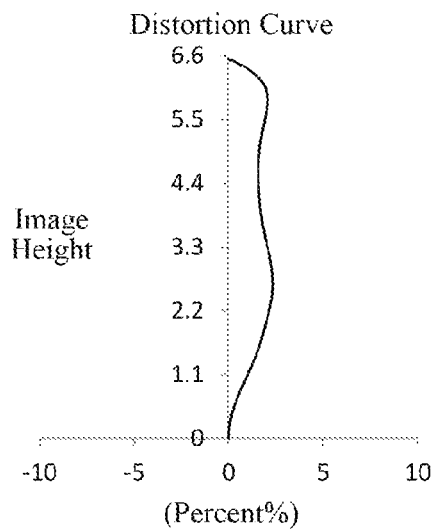
Figure 12D:
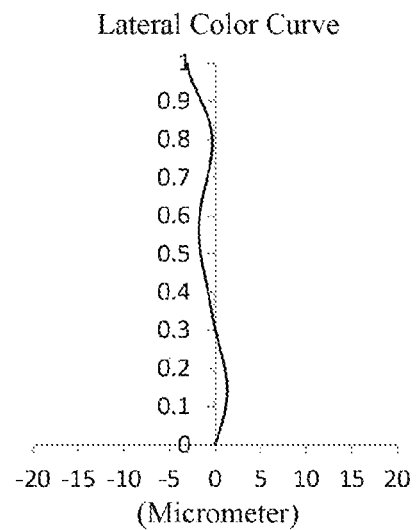

FIG. 12A illustrates a longitudinal aberration curve of the optical imaging system according to example 6, representing differences in the position of the image formed by the lens assembly for light with various wavelengths. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion at different image heights. FIG. 12D illustrates a lateral color curve of the optical imaging system according to example 6, representing deviations of different image heights on an imaging plane after light passes through the lens assembly. It can be seen from FIG. 12A to FIG. 12D that the optical imaging system provided in example 6 may achieve a good image quality.

Example 7

Figure 13:
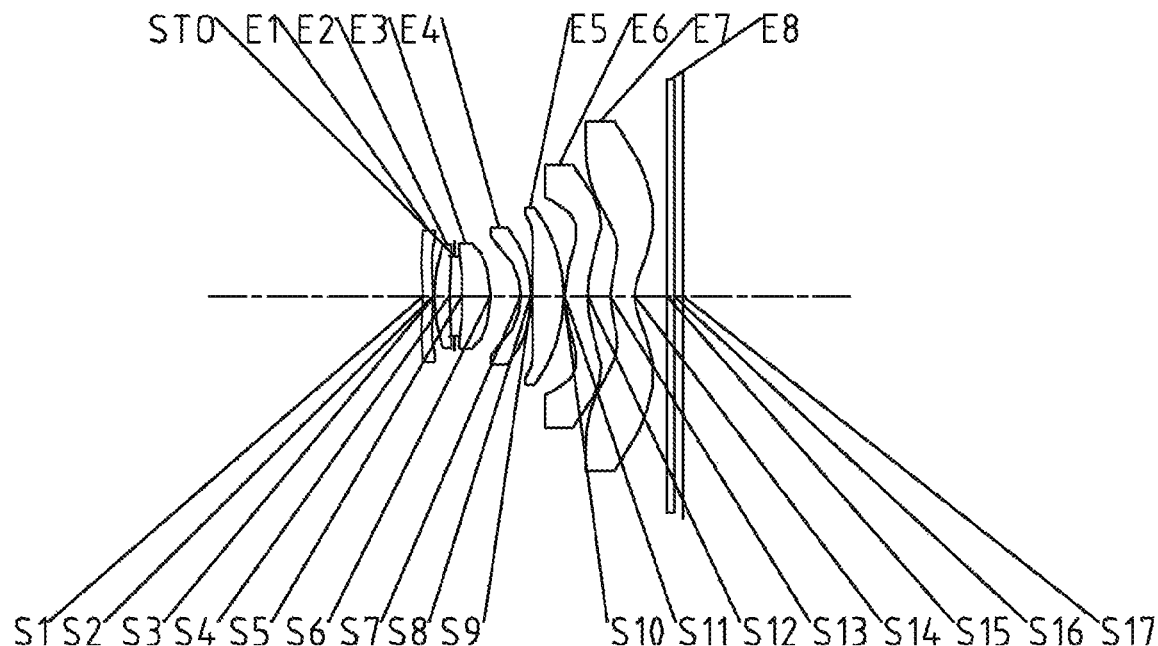
FIG. 13 illustrates a schematic structural view of an optical imaging system according to Example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system satisfies f=4.75 mm, a distance TTL along the optical axis from the object-side surface S1 of the first lens E1 to the imaging plane S17 satisfies TTL=7.72 mm, half of a diagonal length ImgH of an effective pixel area on the imaging plane S17 satisfies ImgH=6.39 mm, half of a maximal field-of-view HFOV of the optical imaging system satisfies HFOV=55.00°, and an aperture number Fno of the optical imaging system satisfies Fno=1.99.

Table 13 shows a table of basic parameters of the optical imaging system in example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Refractive index | Abbe number | Focal length | Conic coefficient |
|---|---|---|---|---|---|---|---|
| OBJ | spherical | infinite | infinite | | | | |
| S1 | aspheric | −76.0640 | 0.3000 | 1.68 | 19.24 | −1973.65 | −62.3071 |
| S2 | aspheric | −77.7991 | 0.0300 | | | | −69.1359 |
| S3 | aspheric | 39.5224 | 0.4556 | 1.55 | 56.11 | 16.72 | 0.0571 |
| S4 | aspheric | 62.2681 | 0.1543 | | | | −1.1175 |
| STO | spherical | infinite | 0.2160 | | | | |
| S5 | aspheric | 515.6378 | 0.8500 | 1.55 | 56.11 | 85.86 | −99.0000 |
| S6 | aspheric | −44.0209 | 0.8984 | | | | 2.4531 |
| S7 | aspheric | −22.3262 | 0.3000 | 1.68 | 19.24 | −6.55 | 0.0683 |
| S8 | aspheric | −43.6065 | 0.0300 | | | | 0.2116 |
| S9 | aspheric | −445.8882 | 0.9428 | 1.55 | 56.11 | 8.52 | −88.3987 |
| S10 | aspheric | −46.2973 | 0.0300 | | | | 0.2967 |
| S11 | aspheric | 35.4634 | 0.6800 | 1.67 | 20.37 | 22.03 | −2.5687 |
| S12 | aspheric | 41.6106 | 0.6696 | | | | −0.7624 |
| S13 | aspheric | 21.3837 | 0.7250 | 1.54 | 55.87 | −16.44 | −0.9592 |
| S14 | aspheric | 15.2409 | 0.9621 | | | | −0.9968 |
| S15 | spherical | infinite | 0.2100 | 1.52 | 64.17 | | |
| S16 | spherical | infinite | 0.2613 | | | | |
| S17 | spherical | infinite | infinite | | | | |

TABLE 14

| Surface number | A4 | A6 | A8 | A10 | A12 |
|---|---|---|---|---|---|
| S1 | 1.1344E−02 | 6.2665E−03 | −7.6851E−03 | 6.6644E−03 | −3.8769E−03 |
| S2 | 2.0859E−02 | 6.6647E−03 | −1.2354E−02 | 1.5525E−02 | −1.2185E−02 |
| S3 | −2.1430E−02 | 1.2618E−02 | −2.3887E−02 | 2.8016E−02 | −2.0182E−02 |
| S4 | −4.2017E−02 | 1.3578E−02 | −6.6044E−03 | −8.6619E−03 | 2.4226E−02 |
| S5 | −2.2022E−02 | 2.7480E−05 | −2.3211E−02 | 4.3817E−02 | −5.0881E−02 |
| S6 | −1.7221E−02 | −3.4934E−03 | −1.1250E−02 | 3.0962E−02 | −4.1168E−02 |
| S7 | 1.4141E−05 | −1.1796E−02 | −1.1244E−02 | 2.8808E−02 | −2.2280E−02 |
| S8 | 5.0752E−02 | −7.5770E−02 | 2.8979E−02 | 2.3109E−03 | −6.6116E−03 |
| S9 | 7.0513E−02 | −5.7071E−02 | 2.5513E−02 | −7.7420E−03 | 1.5880E−03 |
| S10 | −6.8756E−03 | 7.1815E−02 | 5.9928E−03 | −7.9269E−03 | 3.5931E−03 |
| S11 | 2.3375E−02 | −2.3374E−02 | 9.5873E−03 | −3.4669E−03 | 9.4410E−04 |
| S12 | 2.7794E−02 | −2.2404E−02 | 5.9341E−03 | −9.7449E−04 | 1.0222E−04 |
| S13 | −9.3926E−02 | 9.1409E−03 | −7.5346E−05 | −5.2451E−05 | 4.3451E−06 |
| S14 | −1.0893E−01 | 2.1971E−02 | −3.2296E−03 | 3.2501E−04 | −2.1671E−05 |

| Surface number | A14 | A16 | A18 | A20 |
|---|---|---|---|---|
| S1 | 1.3848E−03 | −2.9208E−04 | 3.3198E−05 | −1.5678E−06 |
| S2 | 5.7547E−03 | −1.6039E−03 | 2.4369E−04 | −1.5504E−05 |
| S3 | 7.8076E−03 | −1.1228E−03 | −1.3030E−04 | 4.5774E−05 |
| S4 | −2.7061E−02 | 1.6667E−02 | −5.3562E−03 | 7.0590E−04 |
| S5 | 3.4729E−02 | −1.3912E−02 | 3.0225E−03 | −2.8518E−04 |
| S6 | 3.1261E−02 | −1.3818E−02 | 3.3041E−03 | −3.3296E−04 |
| S7 | 1.0294E−02 | −3.0522E−03 | 5.3204E−04 | −4.0153E−05 |

TABLE 14-continued

| | | | | |
|---|---|---|---|---|
| S8 | 3.0048E−03 | −7.1340E−04 | 9.0272E−05 | −4.7235E−06 |
| S9 | −2.1647E−04 | 1.8402E−05 | −8.3421E−07 | 1.2529E−08 |
| S10 | −8.8053E−04 | 1.2424E−04 | −9.4767E−06 | 3.0236E−07 |
| S11 | −1.7510E−04 | 2.0315E−05 | −1.3170E−06 | 3.6343E−08 |
| S12 | −6.6966E−06 | 2.6150E−07 | −5.4800E−09 | 4.6226E−11 |
| S13 | −1.3829E−07 | 5.0363E−10 | 7.2516E−11 | −1.2636E−12 |
| S14 | 9.2965E−07 | −2.4442E−08 | 3.5547E−10 | −2.1707E−12 |

Figure 14A:
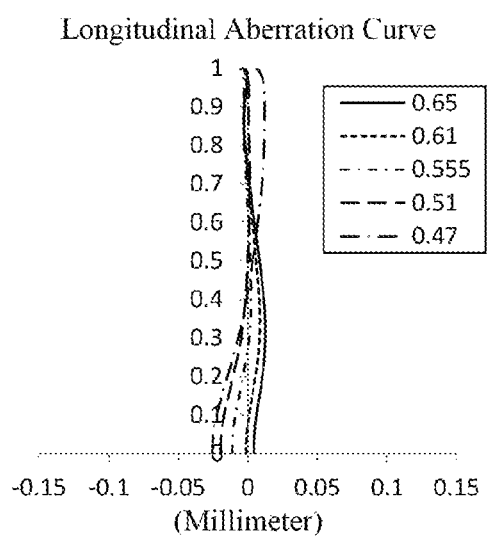
FIGS. 14A to 14D illustrate a longitudinal aberration curve, an astigmatic curve, a distortion curve and a lateral color curve of the optical imaging system of the Example 7, respectively.
Figure 14B:
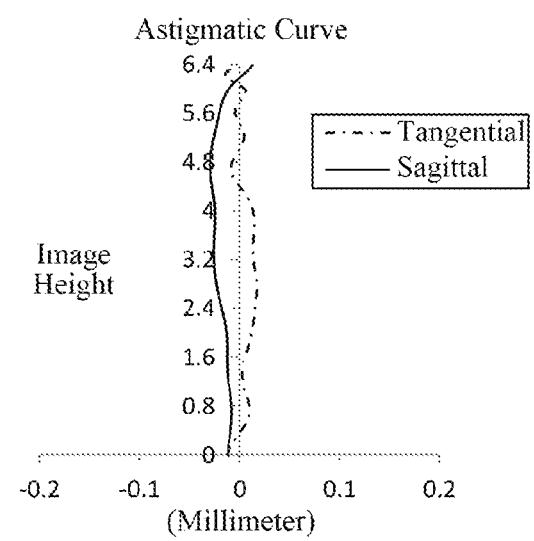
Figure 14C:
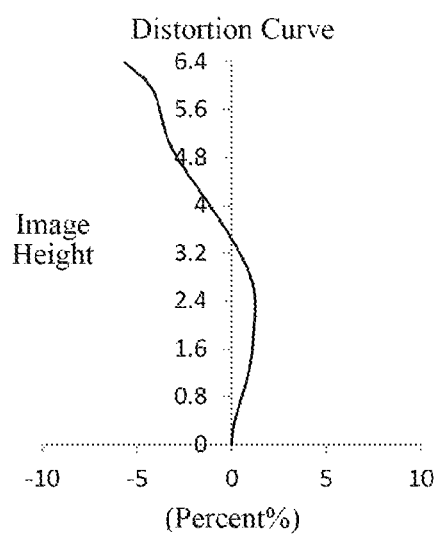
Figure 14D:
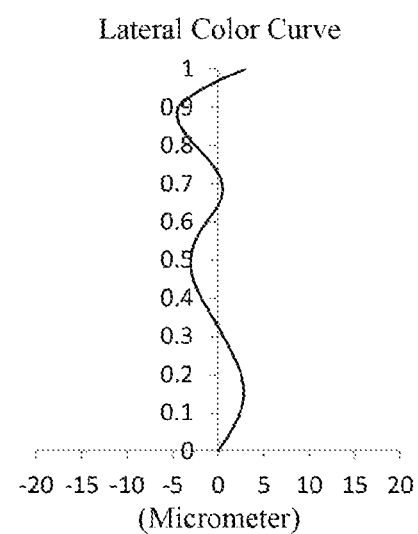

FIG. 14A illustrates a longitudinal aberration curve of the optical imaging system according to example 7, representing differences in the position of the image formed by the lens assembly for light with various wavelengths. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion at different image heights. FIG. 14D illustrates a lateral color curve of the optical imaging system according to example 7, representing deviations of different image heights on an imaging plane after light passes through the lens assembly. It can be seen from FIG. 14A to FIG. 14D that the optical imaging system provided in example 7 may achieve a good image quality.

In view of the above, examples 1 to 7 respectively satisfy the relationship shown in Table 15.

TABLE 15

| | Example | | | | | | |
|---|---|---|---|---|---|---|---|
| Condition | 1 | 2 | 3 | 4 | 5 | 6 | 7 |
| f/f6 | 0.56 | 0.74 | 0.55 | 0.53 | 0.55 | 0.22 | 0.22 |
| tan(HFOV/2)*f (mm) | 2.48 | 2.53 | 2.42 | 2.36 | 2.45 | 2.54 | 2.47 |
| (R13 + R14)/f7 | −0.39 | −0.26 | −0.39 | −0.27 | −0.36 | −0.28 | −0.20 |
| ImgH/|R7 + R8| | 1.04 | 1.12 | 1.01 | 1.02 | 1.04 | 1.12 | 1.07 |
| R1/R2 | 0.90 | 0.83 | 1.01 | 1.30 | 0.88 | 0.82 | 0.98 |
| DT31/DT21 | 0.92 | 0.93 | 0.91 | 0.93 | 0.93 | 0.93 | 0.85 |
| (T34 + T67)/TTL | 0.25 | 0.25 | 0.25 | 0.26 | 0.26 | 0.23 | 0.20 |
| (CT4 + CT5 + CT6)/f | 0.35 | 0.28 | 0.34 | 0.34 | 0.31 | 0.35 | 0.41 |
| |f4/EPD| | 2.17 | 2.44 | 2.17 | 2.29 | 2.21 | 2.43 | 2.75 |
| (R12 − R11)/(R12 + R11) | 0.24 | 0.27 | 0.25 | 0.22 | 0.22 | 0.06 | 0.08 |

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising, a first lens, a second lens, a third lens, a fourth lens, a fifth lens, a sixth lens and a seventh lens, which have refractive power and are sequentially arranged from an object side to an image side of the optical imaging system along an optical axis,
  wherein,
  an object-side surface of the first lens is a concave surface, and an image-side surface of the first lens is a convex surface;
  the sixth lens has a positive refractive power;
  the seventh lens has a negative refractive power, and an object-side surface of the seventh lens is a convex surface;
  wherein 6 mm<ImgH<7 mm, and $$0.22 \leq f/f6 < 1,$$

where ImgH is half of a diagonal length of an effective pixel area on an imaging plane of the optical imaging system, f is a total effective focal length of the optical imaging system and f6 is an effective focal length of the sixth lens.

2. The optical imaging system according to claim 1, wherein 2<|f4/EPD|<3,
  where f4 is an effective focal length of the fourth lens and EPD is an entrance pupil diameter of the optical imaging system.

3. The optical imaging system according to claim 1, wherein 0.5<DT31/DT21<1,
  where DT31 is a maximum effective radius of an object-side surface of the third lens and DT21 is a maximum effective radius of an object-side surface of the second lens.

4. The optical imaging system according to claim 1, wherein 0<(T34+T67)/TTL<0.5,
  where T34 is a spaced interval between the third lens and the fourth lens along the optical axis, T67 is a spaced interval between the sixth lens and the seventh lens along the optical axis and TTL is a distance along the optical axis from the object-side surface of the first lens to the imaging plane of the optical imaging system.

5. The optical imaging system according to claim 1, wherein $0<(CT4+CT5+CT6)/f<0.6$,
where CT4 is a center thickness of the fourth lens along the optical axis, CT5 is a center thickness of the fifth lens along the optical axis, CT6 is a center thickness of the sixth lens along the optical axis and f is the total effective focal length of the optical imaging system.

6. The optical imaging system according to claim 1, wherein $0.6<R1/R2\leq1.5$,
where R1 is a radius of curvature of the object-side surface of the first lens and R2 is a radius of curvature of the image-side surface of the first lens.

7. The optical imaging system according to claim 1, wherein $0<(R12-R11)/(R12+R11)<0.5$,
where R11 is a radius of curvature of an object-side surface of the sixth lens and R12 is a radius of curvature of an image-side surface of the sixth lens.

8. The optical imaging system according to claim 1, wherein $CTi<1$ mm, where $i=1, 2, 3, 4, 5, 6$ or 7,
where CTi is a center thickness of the i-th lens along the optical axis.

9. The optical imaging system according to claim 1, wherein $1.01\leq ImgH/|R7+R8|<1.3$,
where ImgH is half of the diagonal length of the effective pixel area on the imaging plane of the optical imaging system, R7 is a radius of curvature of an object-side surface of the fourth lens and R8 is a radius of curvature of an image-side surface of the fourth lens.

10. The optical imaging system according to claim 1, wherein 2 mm$<\tan(HFOV/2)*f<2.9$ mm,
where HFOV is half of a maximal field-of-view of the optical imaging system and f is the total effective focal length of the optical imaging system.

11. An optical imaging system, comprising: a first lens, a second lens, a third lens, a fourth lens, a fifth lens, a sixth lens and a seventh lens, which have refractive power and are sequentially arranged from an object side to an image side of the optical imaging system along an optical axis,
wherein,
an object-side surface of the first lens is a concave surface, and an image-side surface of the first lens is a convex surface;
the sixth lens has a positive refractive power;
the seventh lens has a negative refractive power, and an object-side surface of the seventh lens is a convex surface;
wherein 6 mm$<ImgH<7$ mm, and $-0.5<(R13+R14)/f7<0$, where ImgH is half of a diagonal length of an effective pixel area on an imaging plane of the optical imaging system, R13 is a radius of curvature of the object-side surface of the seventh lens, R14 is a radius of curvature of an image-side surface of the seventh lens and f7 is an effective focal length of the seventh lens.

12. The optical imaging system according to claim 11, wherein $2<|f4/EPD|<3$,
where f4 is an effective focal length of the fourth lens and EPD is an entrance pupil diameter of the optical imaging system.

13. The optical imaging system according to claim 11, wherein $0.5<DT31/DT21<1$,
where DT31 is a maximum effective radius of an object-side surface of the third lens and DT21 is a maximum effective radius of an object-side surface of the second lens.

14. The optical imaging system according to claim 11, wherein $0<(T34+T67)/TTL<0.5$,
where T34 is a spaced interval between the third lens and the fourth lens along the optical axis, T67 is a spaced interval between the sixth lens and the seventh lens along the optical axis and TTL is a distance along the optical axis from the object-side surface of the first lens to the imaging plane of the optical imaging system.

15. The optical imaging system according to claim 11, wherein $0<(CT4+CT5+CT6)/f<0.6$,
where CT4 is a center thickness of the fourth lens along the optical axis, CT5 is a center thickness of the fifth lens along the optical axis, CT6 is a center thickness of the sixth lens along the optical axis and f is a total effective focal length of the optical imaging system.

16. The optical imaging system according to claim 11, wherein $0.6<R1/R2\leq1.5$,
where R1 is a radius of curvature of the object-side surface of the first lens and R2 is a radius of curvature of the image-side surface of the first lens.

17. The optical imaging system according to claim 11, wherein $0<(R12-R11)/(R12+R11)<0.5$,
where R11 is a radius of curvature of an object-side surface of the sixth lens and R12 is a radius of curvature of an image-side surface of the sixth lens.

18. The optical imaging system according to claim 11, wherein $CTi<1$ mm, where $i=1, 2, 3, 4, 5, 6$ or 7,
where CTi is a center thickness of the i-th lens along the optical axis.

19. The optical imaging system according to claim 11, wherein $1.01\leq ImgH/|R7+R8|<1.3$,
where ImgH is half of the diagonal length of the effective pixel area on the imaging plane of the optical imaging system, R7 is a radius of curvature of an object-side surface of the fourth lens and R8 is a radius of curvature of an image-side surface of the fourth lens.

20. The optical imaging system according to claim 11, wherein 2 mm$<\tan(HFOV/2)*f<2.9$ mm,
where HFOV is half of a maximal field-of-view of the optical imaging system and f is a total effective focal length of the optical imaging system.

* * * * *

UNITED STATES PATENT AND TRADEMARK OFFICE
CERTIFICATE OF CORRECTION

PATENT NO. : 11,460,672 B2
APPLICATION NO. : 16/891808
DATED : October 4, 2022
INVENTOR(S) : Xiaobin Zhang et al.

It is certified that error appears in the above-identified patent and that said Letters Patent is hereby corrected as shown below:

On the Title Page

Column 1, Item (30) Foreign Application Priority Data should be added, and under it should include:
--Jun. 28, 2019 (CN) ......................................201910571245.2--

Signed and Sealed this
Nineteenth Day of December, 2023

Katherine Kelly Vidal
*Director of the United States Patent and Trademark Office*